United States Patent
Hieda et al.

(10) Patent No.: US 6,353,488 B1
(45) Date of Patent: *Mar. 5, 2002

(54) IMAGE SENSING APPARATUS HAVING COMMON CIRCUITRY FOR PROCESSING DIGITAL ADJUSTMENT SIGNALS

(75) Inventors: Teruo Hieda; Shinji Sakai, both of Yokohama; Makoto Shimokoriyama, Kawasaki; Tsutomu Fukatsu, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,079

(22) Filed: Sep. 3, 1996

Related U.S. Application Data

(63) Continuation of application No. 08/409,953, filed on Mar. 23, 1995, now Pat. No. 5,585,844.

(30) Foreign Application Priority Data

Feb. 27, 1991 (JP) .................................. 3-32902

(51) Int. Cl.[7] .......................... H04N 5/225; H04N 1/46; H04N 9/73; H04N 5/235
(52) U.S. Cl. .................... 358/909.1; 358/516; 348/221; 348/224
(58) Field of Search ................................ 348/221–225, 348/229, 135, 130, 188, 211, 224; 358/908, 909.1, 468, 442, 434, 406, 516, 518; H04N 9/73, 9/09, 9/07

(56) References Cited

U.S. PATENT DOCUMENTS 4,782,394 A 11/1988 Hieda (List continued on next page.)

FOREIGN PATENT DOCUMENTS

| DE | 3320690 | 12/1983 |
|---|---|---|
| EP | 0356123 | 2/1990 |
| EP | 0400606 | 12/1990 |
| EP | 0446647 | 9/1991 |
| JP | 63-151273 | 6/1988 |
| JP | 1-220935 | 9/1989 |
| JP | 2-149073 | 6/1990 |
| JP | 2-149075 | 6/1990 |

*Primary Examiner*—Kimberly A. Williams
(74) *Attorney, Agent, or Firm*—Fitzpatrick, Cella, Harper & Scinto

(57) ABSTRACT

An image sensing apparatus includes: a signal processing circuit for processing image sensing signals; a plurality of adjustment signal generating circuits for generating mutually different output signals for automatic adjustment by using part of the signals of the signal processing circuit; an interface for receiving the output of the plurality of adjustment signal generating circuits and outputting it through a common signal path. Also included is a control microprocessor for adjusting a plurality of adjusting sections of the image sensing apparatus by using the output of the plurality of adjustment signal generating circuits output through the common signal path, wherein adjustment of the plurality of adjusting sections of the image sensing apparatus using the output of the plurality of adjustment signal generating circuits is effected with a reduced number of signal paths between the plurality of adjustment signal generating circuits and the control microprocessor, thereby simplifying the circuit construction of the image sensing apparatus as a whole and improving the reliability thereof.

84 Claims, 17 Drawing Sheets

U.S. PATENT DOCUMENTS

| | | |
|---|---|---|
| 4,805,010 A | 2/1989 | Shroyer et al. |
| 4,814,861 A | 3/1989 | Hieda |
| 4,827,349 A | 5/1989 | Ogata et al. |
| 4,860,092 A | 8/1989 | Hieda |
| 4,901,152 A | 2/1990 | Hieda |
| 5,027,214 A | 6/1991 | Fujimori |
| 5,034,804 A | 7/1991 | Sasaki et al. |
| 5,043,816 A | 8/1991 | Nakano et al. |
| 5,093,716 A | 3/1992 | Kondo et al. |
| 5,185,659 A | 2/1993 | Itagaki et al. |
| 5,264,921 A * | 11/1993 | Tinnai |
| 5,319,449 A | 6/1994 | Saito et al. |
| 5,351,078 A * | 9/1994 | Lemelson .................... 348/135 |
| 5,436,656 A * | 7/1995 | Soga et al. .................. 348/221 |
| 5,585,844 A * | 12/1996 | Hieda et al. ................. 348/224 |

\* cited by examiner

DENOTE $C_{ij}$

DENOTE $(R-Y)_{ij}$ AND $(B-Y)_{ij}$

IMAGE SENSING APPARATUS HAVING COMMON CIRCUITRY FOR PROCESSING DIGITAL ADJUSTMENT SIGNALS

This application is a continuation of application Ser. No. 08/409,953 filed Mar. 23, 1995 now U.S. Pat. No. 5,585,844.

BACKGROUND OF THE INVENTION

1. Field of the Invention

The present invention relates to an image sensing apparatus and, in particular, to an image sensing apparatus which is suitable for circuit integration resulting from the digitization of signal processing operations in such an image sensing apparatus.

2. Related Background Art

There have been remarkable developments in the field of image sensing apparatuses, such as video cameras. The performance of such apparatuses has been improved and enhanced in various ways, for example, by equipping them with a number of functions. Further, a digital signal processing operation has recently been introduced into this field.

In this regard, an image sensing apparatus has already been proposed in which an output from an image sensing device such as a two-dimensional CCD having minute color separation filters arranged over the entire surface thereof, is digitized by means of an AD converter, and subjected to a signal processing operation by a signal processing circuit using a digital processing technique, thereby obtaining television signals.

Further, integration of such image sensing apparatuses has been considered.

In the prior-art technique described above, however, the circuits for automatically effecting the focusing, exposure adjustment, white balance adjustment, etc. of the image sensing apparatus are controlled separately through different signal paths by means of a microcomputer, with the result that the construction of the image sensing apparatus as a whole is rather complicated. Further, in the prior-art technique, the number of IC chips used is rather large and, moreover, it is hard to integrate these IC chips. These factors have been a barrier to reducing the size of the image sensing apparatus as a whole. In such an image sensing apparatus, the digital signal processing is separately performed in different sections of the apparatus. Thus, it has been impossible to realize a digital integrated circuit for video cameras which is capable of synthesizing the performance of signal processing operations in a digital video camera.

SUMMARY OF THE INVENTION

The present invention has been made with a view toward solving the problems mentioned above. It is a first object of the present invention to provide an image sensing apparatus in which a plurality of signal processing operations in the apparatus are simplified, and in which the number of signal paths is substantially reduced, thereby simplifying the construction of the control system and improving the reliability of the image sensing apparatus.

A second object of the present invention is to provide an image sensing apparatus in which an adjustment on adjusting sections related to an image sensing operation using the output of various adjustment signal generating means in the image sensing apparatus can be performed with substantially simplified signal paths between the adjustment signal generating means and the control means.

To achieve these objects, there is disclosed in accordance with a preferred embodiment of the present invention, an image sensing apparatus comprising:

signal processing means for processing image sensing signals;

a plurality of adjustment signal generating means for generating mutually different signals for automatic adjustment by using part of the signals of the signal processing means;

interface means for inputting the output of the plurality of adjustment signal generating means and outputting it through a common signal path; and control means for adjusting a plurality of adjusting sections of the image sensing apparatus by using the output of the plurality of adjustment signal generating means output through the common signal path.

A third object of the present invention is to provide an image sensing apparatus in which the signal paths between the control means and a plurality of signal processing blocks for performing various signal processing operations of the image sensing apparatus and the signal processing operations are simplified, thereby making it possible to realize a one-chip-type control circuit for controlling an image sensing operation.

A fourth object of the present invention is to provide an image sensing apparatus in which it is possible to use a semiconductor device of a small mounting area having a substantially reduced number of output terminals, thereby improving the reliability of the image sensing apparatus.

A fifth object of the present invention is to provide an image sensing apparatus in which adjustment of a plurality of adjusting sections of an image sensing apparatus by means of the output of the plurality of adjustment signal generating circuits can be performed with substantially reduced signal paths between a plurality of adjustment signal generating circuits and a control microprocessor, thereby simplifying the circuit construction of the image sensing apparatus as a whole and improving the reliability thereof.

To achieve these objects, there is disclosed in accordance with a preferred embodiment of the present invention, an image sensing apparatus comprising the following components which are integrated on a common semiconductor:

signal processing means for processing image sensing signals;

a plurality of adjustment signal generating means for generating mutually different signals for automatic adjustment by utilizing part of the signals of the signal processing means; and interface means for inputting the output of the plurality of adjustment signal generating means and outputting it through a common signal path.

A sixth object of the present invention is to provide an image sensing apparatus in which various adjusting circuits of the image sensing apparatus are adapted to perform digital signal processing operations, and in which the control system for these signal processing circuits is simplified, thereby realizing a one-chip microprocessor for image sensing apparatuses.

A seventh object of the present invention is to provide a digital signal processing circuit IC for video cameras in which digital signal processing circuit blocks for automatic focusing, white balance adjustment, and automatic iris adjustment are realized in a one-chip structure.

An eighth object of the present invention is to provide a digital signal processing circuit interface for video cameras in which interface blocks for outputting parameters for performing adjustments regarding an image sensing operation, such as automatic focusing, white balance adjustment and automatic iris adjustment to a common arithmetic circuit are realized in a one-chip structure.

Other objects and features of the present invention will become apparent from the following embodiments and drawings.

BRIEF DESCRIPTION OF THE DRAWINGS

FIG. 11 is a flowchart illustrating the operation of an MPU in the embodiment of FIG. 10 when power is turned on;

DETAILED DESCRIPTION OF THE PREFERRED EMBODIMENTS

First Embodiment

Figure 1:
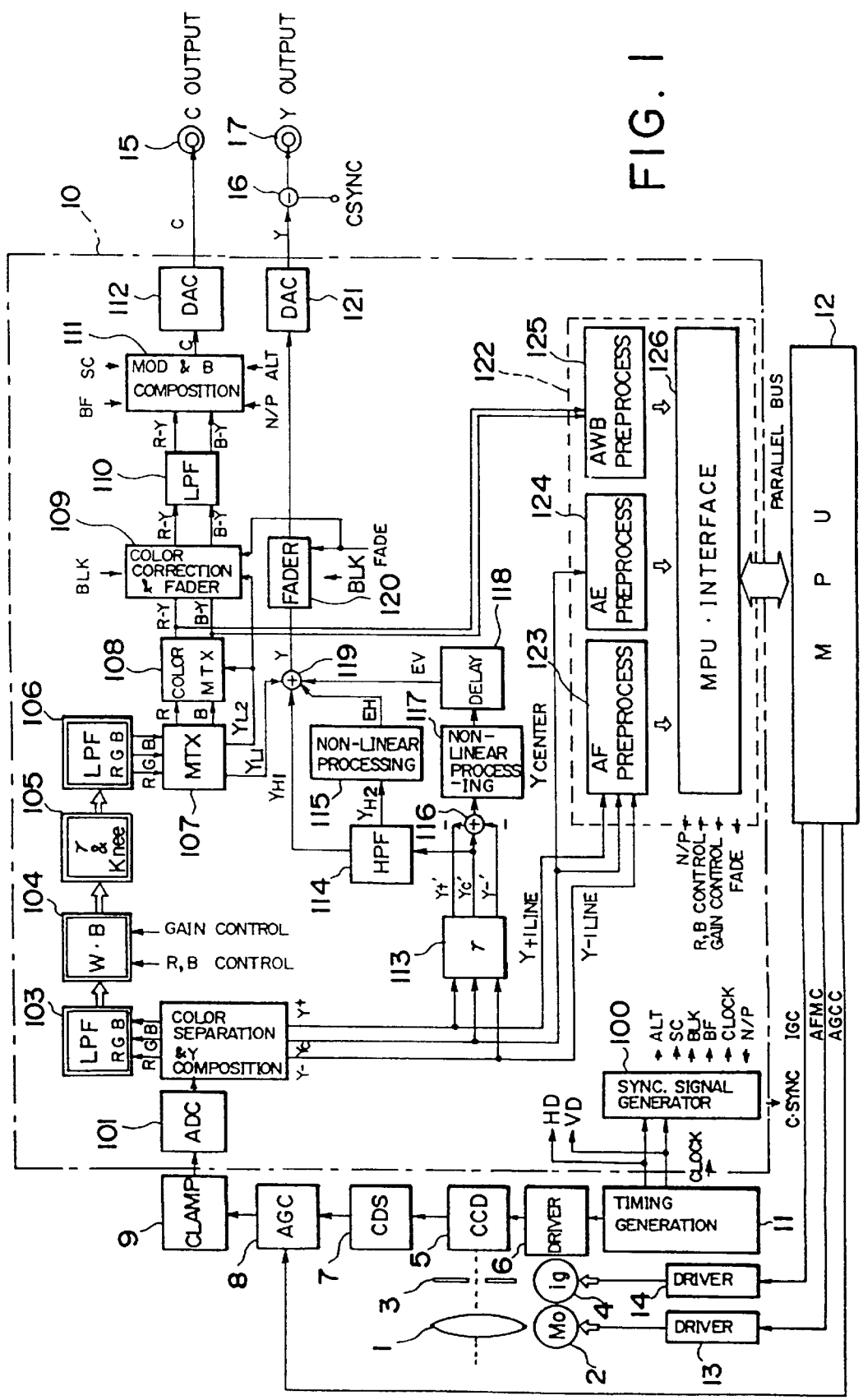
FIG. 1 is diagram showing an embodiment of the present invention.

FIG. 1 is a block diagram illustrating an embodiment of the present invention.

Numeral 1 indicates an image sensing lens; numeral 2 indicates an automatic focusing (AF) motor for rotating a focus ring of the image sensing lens 1; numeral 3 indicates a diaphragm; numeral 4 indicates an IG meter for controlling the aperture of the diaphragm 3; and numeral 5 indicates a two-dimensional color image sensing device including minute color separating filters (hereinafter referred to as "CCD"). However, the image sensing device of the present invention is not restricted to CCD; it is also possible to employ an image pickup tube or an X-Y address sensor. Numeral 6 indicates a CCD driver for driving the CCD 5; numeral 7 indicates a correlative double sampling circuit (CDS) for removing clocks and reset noise from the photo-electric conversion output of the CCD 5; numeral 8 indicates an automatic gain control amplifier (AGC) for amplifying the output of the CDS 7 in accordance with a control signal AGCC; numeral 9 indicates a clamp circuit for fixing the black level of an input voltage to a fixed voltage; numeral 10 indicates an integrated circuit for performing signal processing operations on the output signals of the CCD supplied thereto to form predetermined color video signals; numeral 12 indicates a microprocessor unit (MPU) which receives digital data on the signals supplied from the integrated circuit 10, controls the integrated circuit 10 and, further, generates signals for controlling the AF motor 2, the IG meter 4, and the AGC 8; numeral 13 indicates an AF driver circuit for driving the AF motor 2; numeral 14 indicates an IG driver circuit for driving the IG meter 4; numeral 15 indicates a chrominance signal (C) output terminal; and numeral 16 indicates a luminance signal (Y) output terminal.

Numerals 100 to 126 indicate inner circuit components of the integrated circuit 10, of which numeral 100 indicates a synchronization signal generator which generates a blanking pulse BLK, a burst flag pulse BF, a color sub-carrier SC, a line sequential signal ALT, a composite synchronization signal CSYNC, etc. for the generation of standard television signals, in response to a clock pulse, a horizontal synchronization pulse HD and a vertical synchronization pulse VD which are supplied from a timing generation circuit 11, an NTSC and a PAL switching signal N/P which are supplied from the MPU 12, and clock pulses of different frequencies needed for the interior of the integrated circuit 10.

Numeral 101 indicates an AD converter for generating digital signals in accordance with input signals. The circuits from this AD converter onward treat digital signals. Numeral 102 indicates a color-separation/luminance signal-synthesis circuit which includes two delay lines of one horizontal line, a matrix circuit and a switching circuit and which is adapted to separate color signal components R, G and B from input signals and to synthesize a luminance signal Yc, and further, to synthesize luminance signals Y− and Y+ which are vertically shifted by one line upwardly and downwardly from Yc. Numeral 103 indicates a low-pass filter for effecting band restriction and time-division sampling; and numeral 104 indicates a white balance (WB) circuit for varying the gains of time-divided color channels.

Numeral 105 indicates a gamma & Knee circuit for performing gamma correction and level compression of high-luminance components; numeral 106 indicates a low-pass filter which receives time-division signals to convert them to continuous parallel signals of three channels (R, G and B) and which further effects band restriction; numeral 107 indicates a matrix circuit which synthesizes low-band luminance signals YL1 and YL2 from R, G and B; numeral 108 indicates a color difference matrix circuit for generating signals R-Y and B-Y from R, B and YL2; numeral 109 indicates a color correction circuit for performing gain control over the color-difference signals and which includes a color correction matrix; numeral 110 indicates a low-pass filter; and numeral 111 indicates a modulation circuit which adds up the color-difference signals after modulating them by a color sub-carrier (SC) and which further adds a color burst signal.

Numerals 112 and 121 indicate DA converters for converting digital signals to analog signals; numeral 113 indicates a gamma-correction circuit for performing gamma correction on the three luminance signals input; numeral 114 indicates a high-pass filter which only passes predetermined high-luminance components of the luminance signals; numeral 115 and 117 indicates non-linear processing circuits which compress those input signals which are around the zero level; numeral 118 indicates a delay line for effecting delay corresponding to the delay time of the high-pass filter 114; numeral 119 indicates an adder; and numeral 120 indicates a fader for changing the gains of the luminance signals and performing blanking processing.

Numeral 122 indicates a preprocessing section which performs processing such that the delivery of data to and from the MPU and the processing by the MPU are facilitated when the MPU reads those signals of the different sections of the integrated circuit 10 which are necessary for control operations, such as automatic focusing (AF), automatic exposure control (AE) and automatic white balance control (AWB). The circuits indicated by numerals 123 to 126 are provided in the preprocessing section 122. An AF preprocessing circuit 123 performs preprocessing of AF; an AE preprocessing circuit 124 performs preprocessing of AE; an AWB preprocessing circuit 125 performs preprocessing of AWB; and an MPU interface circuit 126 delivers the output of these preprocessing circuits to the MPU 12, and receives control data on the different sections of the integrated circuit 10 supplied from the MPU 12.

Next, the operation of the above embodiment will be described. An image of a subject (not shown) is adjusted in terms of quantity of light by the image sensing lens 1 and diaphragm 3, and is transmitted through the above-mentioned minute color separation filters of the CCD 5 to undergo color separation. Then, the image is formed on the photoelectric conversion surface of the CCD to undergo photoelectric conversion pixel by pixel, and output sequentially as image sensing signals in response to the driving pulses of the driver circuit 6. First, the clock components and reset noise are removed from these image sensing signals by the CDS circuit 7, and the signals are amplified by the AGC circuit 8 in accordance with the gains corresponding to the AGCC signals. The black level is fixed to a reference voltage which is substantially at the lower limit of the input range of the ADC circuit 101, and the signals are converted to digital signals by the AD converter 101 in the integrated circuit 10.

These digital signals are first separated into color components of R, G and B by the color separation/Y-synthesis circuit 102. At the same time, the luminance signal YC is synthesized along with the luminance signal Y−, which is one horizontal line above (before) this luminance signal, and the luminance signal Y+, which is one horizontal line below (after) this luminance signal. These R, G and B signals are restricted to a fixed band by the low-pass filter 103, and then three-phase-converted to time-division signals to become one-channel signals. In the WB circuit 104, these signals are amplified in accordance with fixed gains set by the MPU 12. In this process, white balance adjustment is effected by changing only the gains of the R and B signals, and, by simultaneously varying the gains of the R, G and B signals, an overall gain control can be effected.

This output is subjected to gamma correction and high-luminance-component compression by the gamma & Knee circuit 105, and is restored to the R, G and B signals by the low-pass filter 106. After being restricted to a fixed band, the R, G and B color signals are added up at a fixed ratio by the matrix circuit 107 to form low-pass luminance signals YL1 and YL2. As stated below, YL1 is subjected to re-sampling at the same sampling rate as a high-pass luminance signal so as to form a high-pass luminance signal. YL2 is not subjected to re-sampling since it is only used for the formation of color difference signals.

Subtraction is performed on the YL2, R and B at a fixed ratio by the color difference matrix circuit 108 to form color difference signals R−Y and B−Y. These color difference signals are subjected to gain control, predetermined matrix computation and color correction by the color-correction/fader circuit 109. Further, when the MPU 12 designates a fading operation, a gradual gain variation is effected. This output is subjected to re-sampling by the low-pass filter 110 at a sampling rate needed for color modulation, for example, four times the frequency of the color sub-carrier SC, restricted to a fixed band, and modulated at the modulation circuit 111 by the color subcarrier SC, with a burst signal being superimposed in accordance with a burst flag signal BF. If, at this time, the N/P signal designates PAL, the burst signal and chrominance signal are inverted in a fixed phase in accordance with the ALT signal so as to be adapted to the PAL standard.

This output is digital-analog converted by the DA converter 112 and output from a C-output terminal 15 as a chrominance signal to be supplied to a VTR, television monitor or the like (not shown).

The luminance signals Yc, Y− and Y+, output from the color-separation/Y-synthesis circuit 102, are subjected to gamma correction by the gamma correction circuit 113 to form, first, high-pass luminance signals YH1 and YH2 by means of the high-pass filter 114. Here, it is assumed that the signal YH1 is beyond the band of the low-pass luminance signal YL1 for generating the above-mentioned luminance signal, and that the range of the signal YH2 is 3 to 4 MHz or more, etc.

The signal YH2 is converted by the non-linear processing circuit 115 to a horizontal contour emphasis signal EH which has undergone compression around the zero level. The output of the gamma correction circuit 113 is subjected to addition and subtraction by the adder 116 and is likewise subjected to compression around the zero level by the non-linear processing circuit 117, and delayed by the delay circuit 118 to become a vertical contour emphasis signal EV. The signals YL1, YH1, EH and EV are added up by the adder 119 to form a luminance signal Y, which is subjected to blanking processing by the fader 120, and, as in the above case, a gradual gain variation is effected at the time of the fading operation.

The output signal is digital-analog converted by the DA converter 121 and added to the composite synchronization signal CSYNC by the adder 16, and is output from a Y-output terminal 17 to be supplied, as in the above-described case, to a VTR, television monitor or the like (not shown).

The signals Yc, Y− and Y+ are processed by the AF preprocessing circuit 123 to form requisite data for AF, and the signal Yc is processed by the AE preprocessing circuit 124 to form requisite data for AE. Further, the output signals R−Y and B−Y from the above-described color difference matrix circuit 108 are processed by the AWB preprocessing circuit 125 to form requisite data for AWB. These items of data are read by the MPU circuit 12 through the MPU interface circuit 126.

Figure 2:
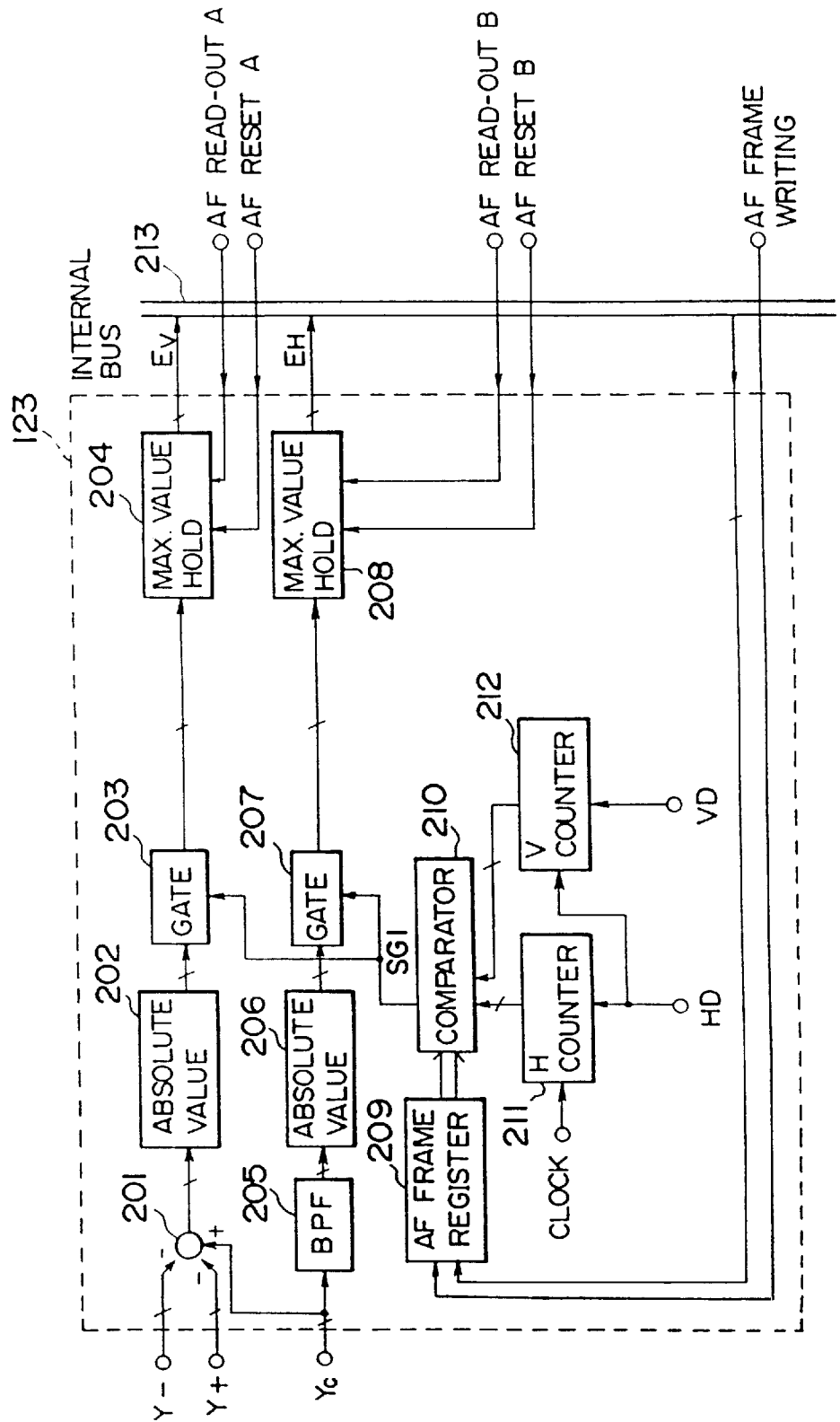
FIG. 2 is a detailed diagram illustrating an AF pre-processing in the embodiment of FIG. 1.

FIG. 2 shows in detail the AF preprocessing circuit 123 of FIG. 1. Numeral 201 indicates an adder; numerals 202 and 206 indicate absolute value circuits for obtaining the absolute values of input signals; numerals 203 and 207 indicate gate circuits for gating input signals in accordance with a gate signal SG1; numerals 204 and 208 indicate maximum value hold circuits for holding the maximum values of input signals; numeral 205 indicates a band pass filter; numeral 209 indicates an AF frame register for retaining the position and size of an AF frame on an image plane; numeral 210 indicates a comparator; numeral 211 indicates an H counter which is reset by a horizontal synchronization signal HD to count clocks; numeral 212 indicates a V counter which is reset by a vertical synchronization signal VD to count HD; and numeral 213 indicates an internal bus for connecting the AF preprocess circuit 123, the AE preprocess circuit 124 and the AWB preprocess circuit 125 to the MPU interface circuit 126.

First, the H counter 211 and the V counter 212 generate a signal corresponding to the present scanning position of an image sensing signal in the image plane, and the signal is compared by the comparator 210 with frame data previously written to the AF frame register 209 to generate a frame signal SG1 representing the AF frame, i.e., the extraction range of the image sensing signal for AF.

A high-frequency-band component ranging, e.g., from 1 to 3 MHz, which is required for AF, is extracted from the input luminance signal Yc by the band pass filter 205, and the absolute value thereof is obtained by the absolute value circuit 206 to be gated by the gate circuit 207 in accordance with the above-mentioned gate signal SG1 within the range corresponding to the above-mentioned AF frame, the maximum value hold circuit 208 holding the maximum value EH of the high-frequency component in the horizontal direction in the above AF frame.

In this process, an AF reset signal B is generated, for example, during vertical blanking interval, by the MPU interface circuit 126, thereby resetting the maximum value hold circuit 208. Afterwards, the maximum value EH held by the maximum value hold circuit 208 is output to the internal bus 213 due to the generation of an AF read signal B at the beginning of the next vertical blanking interval.

Further, in the adder 201, addition and subtraction are performed on the luminance signals Yc, Y− and Y+, to obtain a high-pass component in the vertical direction, which is converted to an absolute value by the absolute value circuit 202, and gated by the gate circuit 203 in accordance with the above-mentioned gate signal SG1, and the maximum value EV of the high-frequency component in the vertical direction within the AF frame is held by the maximum value hold circuit 204.

As in the case of the maximum value hold circuit 208, the operations of resetting and reading out to the internal bus 213 of the data being held are performed in accordance with an AF reset signal A and an AF read-out signal A, respectively.

Figure 13:
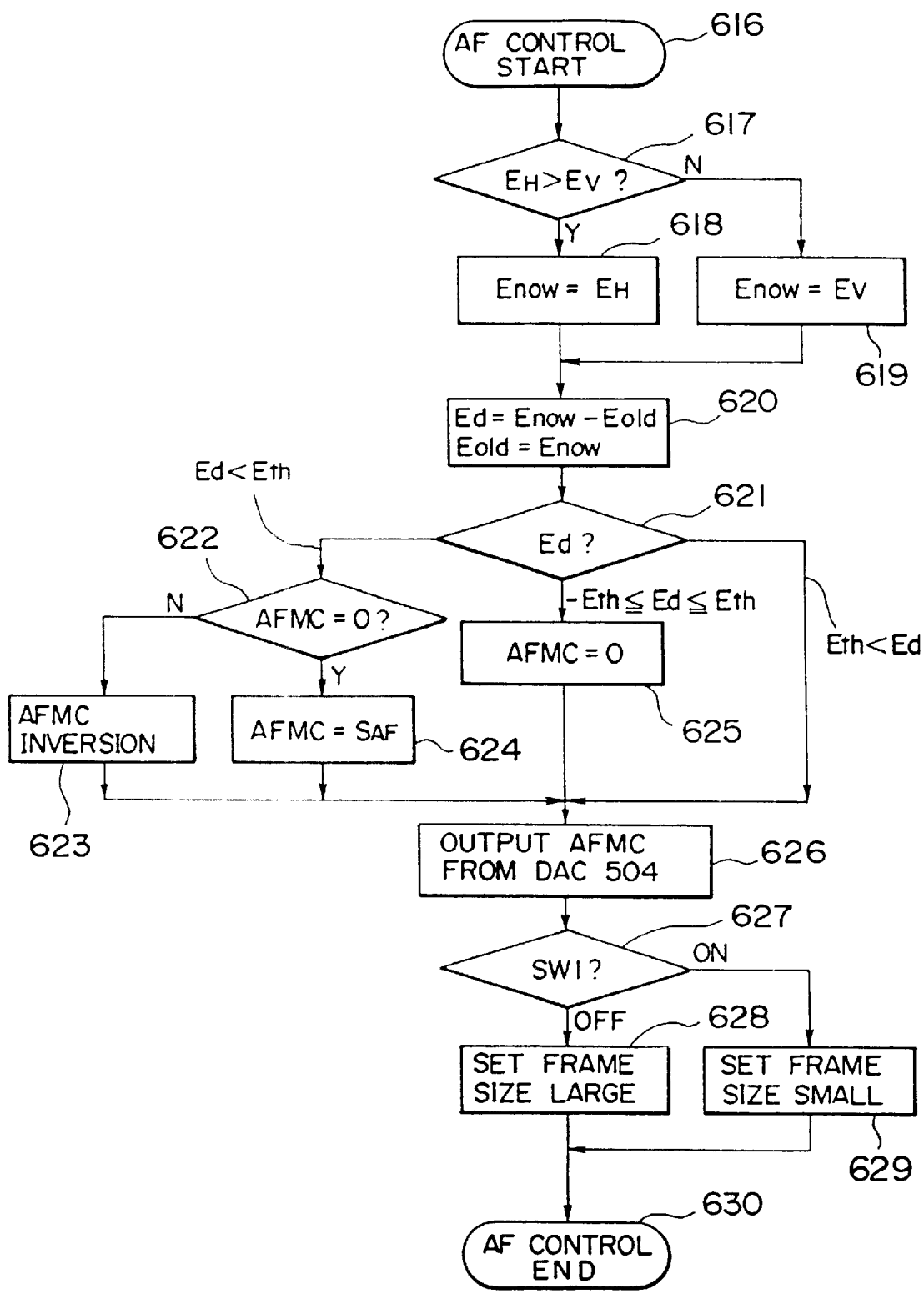
FIG. 13 is a diagram illustrating an operation of AF control in step 612 of the operation flowchart of FIG. 12.

The maximum values in the horizontal and vertical directions of the high-frequency component thus read out are used in AF control in accordance with the algorithm shown in FIG. 13.

Figure 3:
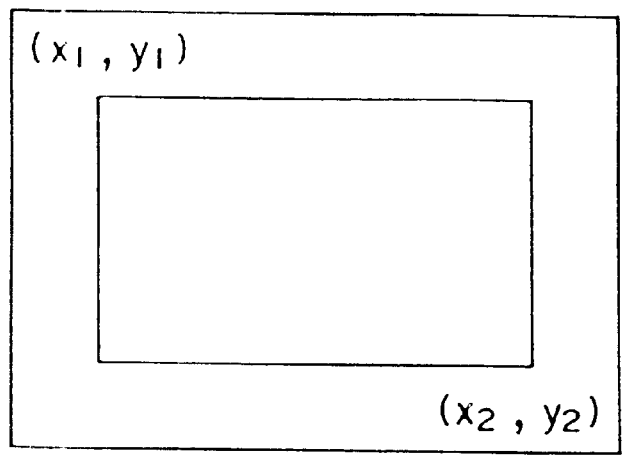
FIG. 3 is a diagram illustrating the case where the AF frame of FIG. 2 is enlarged.
Figure 4:
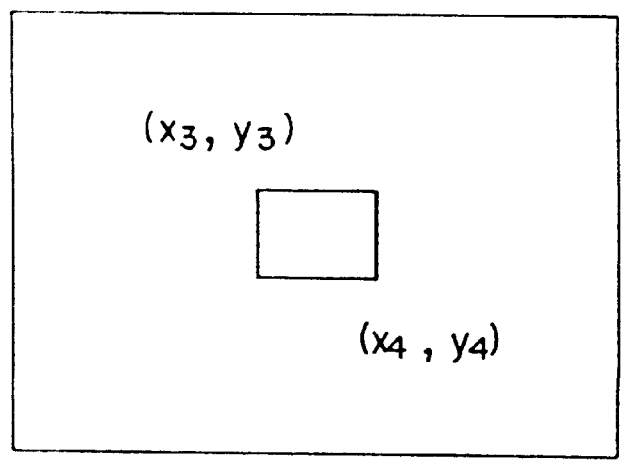
FIG. 4 is a diagram illustrating the case where the AF frame of FIG. 2 is reduced.

FIGS. 3 and 4 illustrate the AF frame of FIG. 2. In the drawings, the outer frame represents an image plane, and the inner frame represents the AF frame. When, for example, coordinate values x1, y1, x2 and y2 are written to the AF register 209 in the manner shown in FIG. 3, the AF frame obtained is relatively large with respect to the image plane, and when coordinate values x3, y3, x4 and y4 are written in the manner shown in FIG. 4, the AF frame obtained is relatively small with respect to the image plane. Switching between the two manners of writing is effected by a switch SW1 of FIG. 10 described below. The pattern of the AF frame is not restricted to that of this embodiment. Further, it is also possible for a plurality of AF frames to exist simultaneously.

Figure 5:
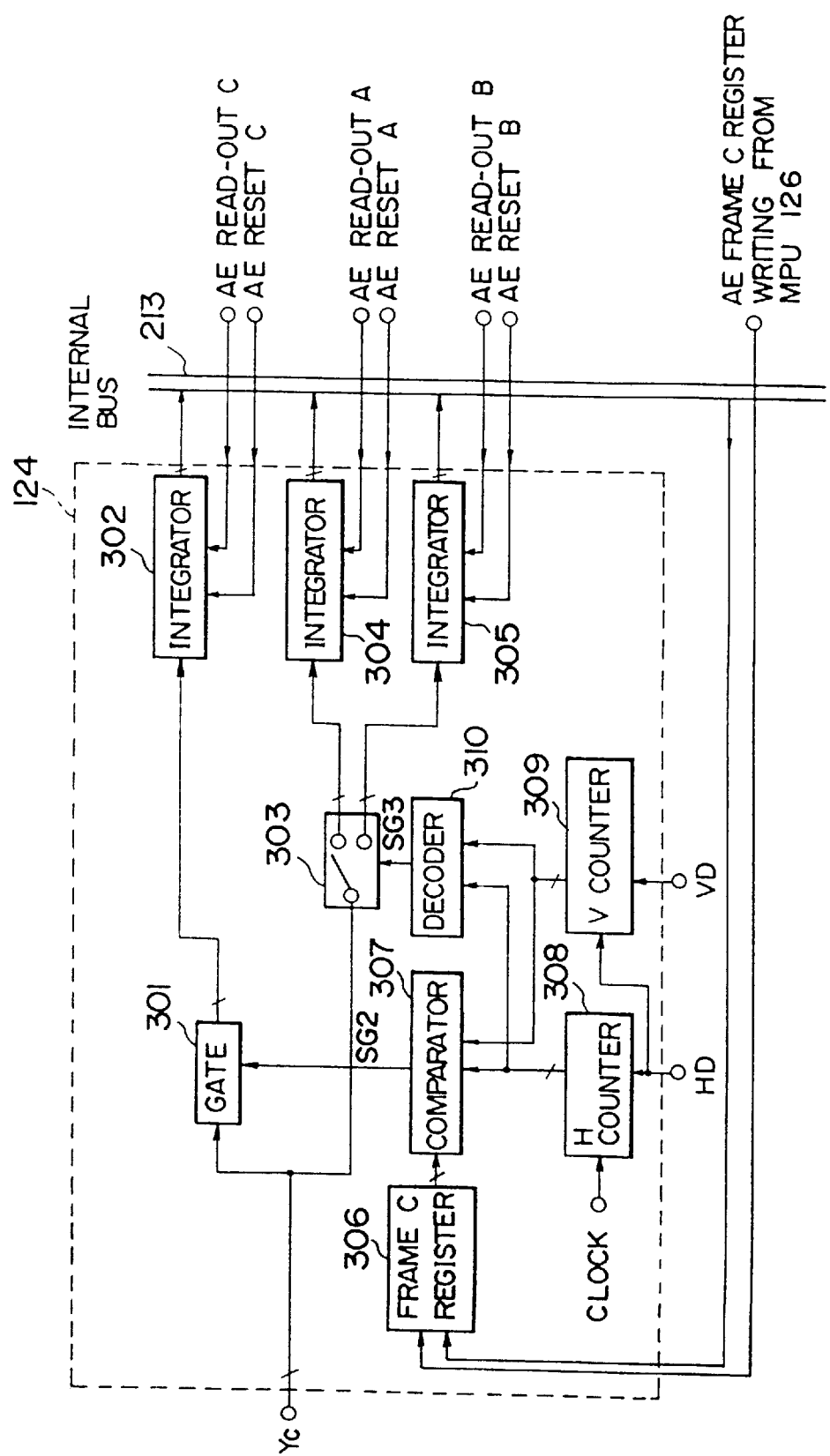
FIG. 5 is a detailed diagram illustrating an AE pre-processing in the embodiment of FIG. 1.

FIG. 5 shows in detail the AE preprocess circuit 124 of FIG. 1. Numeral 301 indicates a gate circuit for setting an AE frame in the image plane; numerals 302, 304 and 305 indicate integrators; numeral 303 indicates a switching circuit; numeral 306 indicates a C-frame register; numeral 307 indicates a comparator; numeral 308 indicates an H counter which is reset by HD and adapted to count clocks; numeral 309 indicates V counter which is reset by VD and adapted to count clocks; and numeral 310 indicates a decoder for generating a predetermined frame signal.

First, a signal corresponding to the scanning position of the image sensing signal in the image plane is generated by the H counter 308 and the V counter 309, and this signal is compared by the comparator 307 with C-frame data previously written to the C-frame register from the MPU interface circuit 126 by an AE-frame-C-register writing pulse, thereby generating a frame signal SG2. At the same time, the output of the H counter 308 and that of the V counter 309 are input to the decoder 310 to form a predetermined frame signal SG3.

The input luminance signal Yc is first gated by the gate circuit 301 in accordance with the gate signal SG2 of a movable frame, and is integrated by the integrator 302. At this time, an AE reset signal C is generated by the MPU interface circuit 126, for example, during the vertical blanking interval, thereby resetting the integrator 302. When an AE read-out signal C is generated by the MPU interface circuit 126 at the beginning of the next vertical blanking interval, data which has been integrated by the integrator 302 is output to the internal bus 213.

Further, the luminance signal Yc is switched by the switching circuit 303 in accordance with the gate signal SG3 of a predetermined frame, and is integrated by the integrator 304 or 305.

At this time, as in the above-described case, the resetting of the integrators 304 and 305 and data output are effected in accordance with the AE reset signals A and B and the AE read-out signals A and B.

Figure 6:
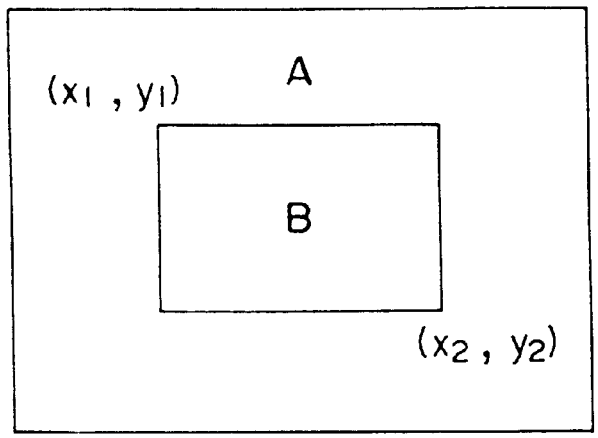
FIG. 6 is a diagram illustrating a centralized AE photometric distribution in FIG. 5.
Figure 7:
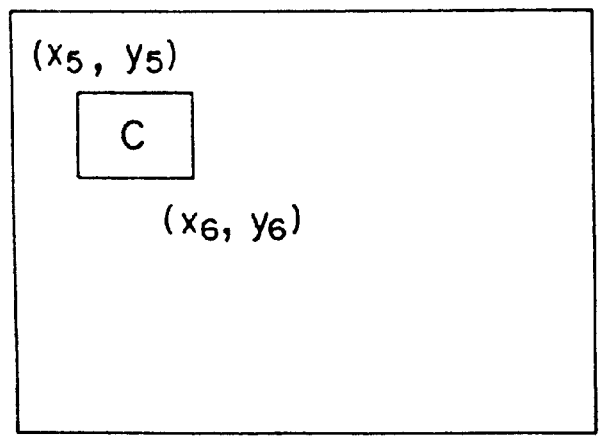
FIG. 7 is a diagram illustrating a counter-light measurement frame in FIG. 5.

FIGS. 6 and 7 are diagrams illustrating the operation of the circuit shown in FIG. 5. In the drawings, the outer frame represents the image plane. In FIG. 6, the portion on the outside of the frame represented by predetermined coordinate values (X1, Y1) and (X2, Y2) is referred to as area A, and the portion on the inside of the same is referred to as area B, the luminance signals in these areas being respectively input to the integrators 304 and 305 shown in FIG. 5. When coordinate values (x5, y5) and (x6, y6) are written to the C-frame register 306, a C-frame as shown in FIG. 7 is obtained, and the luminance signal on the inside of the frame is input to the integrator 302 shown in FIG. 5.

The output of the integrators 302, 304 and 305 thus read out are used in AE control in accordance with the algorithm shown in FIGS. 14 to 17 described below. The pattern of the AE frame is not restricted to the above described; the position, number, combination, etc. thereof may be changed as needed.

Figure 8:
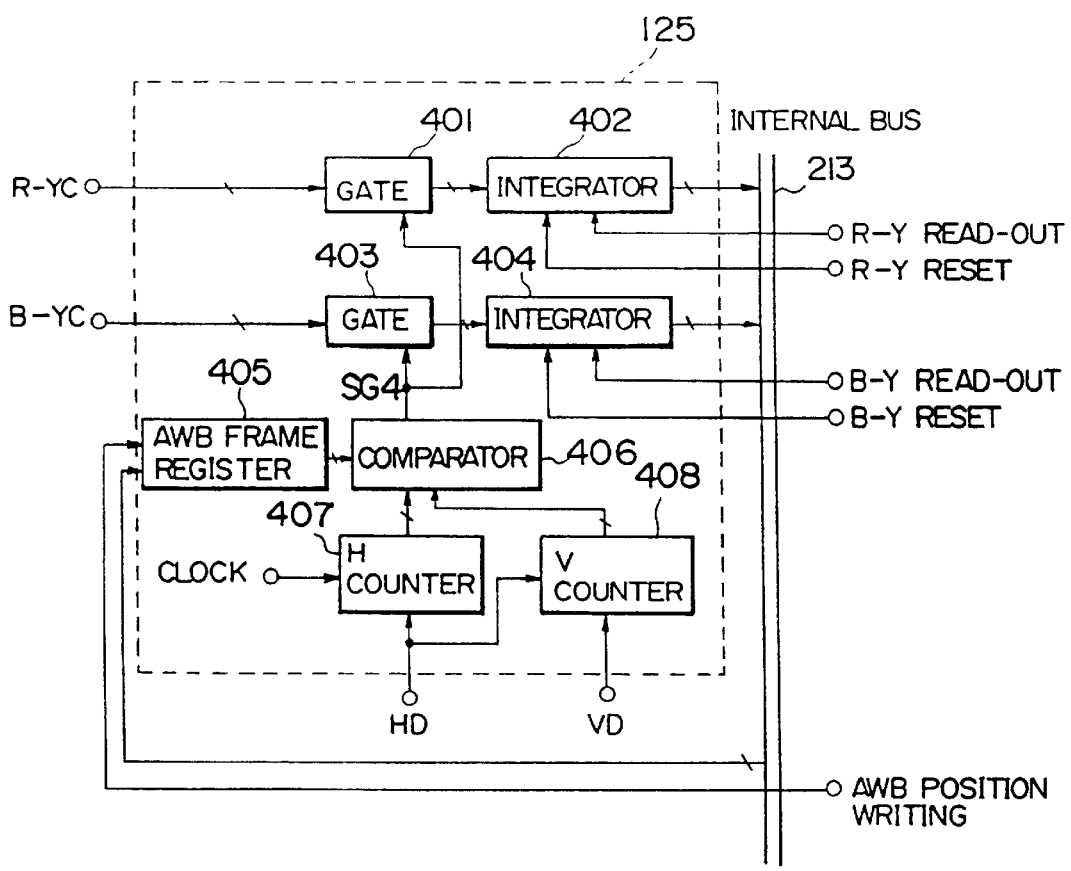
FIG. 8 is a detailed view of an AWB pre-process in the embodiment of FIG. 1.

FIG. 8 shows in detail the AWB preprocess circuit 125 of FIG. 1. Numerals 401 and 403 indicate gate circuits for setting an AWB frame; numerals 402 and 404 indicate integrators; numeral 405 indicate an AWB frame register; numeral 406 indicates a comparator; numeral 407 indicates an H counter which is reset by HD and adapted to. count clocks; and numeral 408 indicates a V counter which is reset by VD and adapted to count HD.

First, the H counter 407 and the V counter 408 generate signals corresponding to the scanning position of the image sensing signal in the image plane, and these signals are compared by the comparator 406 with AWB-frame data written to the AWB frame register 405 from the MPU interface circuit 126 in accordance with AWB-frame-register writing pulses., thereby generating a gate signal SG4.

The input color difference signals R-Y and B-Y are first gated by the gate circuits 401 and 403 in accordance with the AWB frame gate signal SG4, and are integrated by the integrators 402 and 404. During, for example, the vertical blanking interval, R-Y reset signal and B-Y reset signal are generated by the MPU interface circuit 126, and the integrators 402 and 404 are reset. At the beginning of the next blanking interval, R-Y read-out signal and B-Y read-out signal are generated, and integrated data is output to the internal bus 213.

Figure 9:
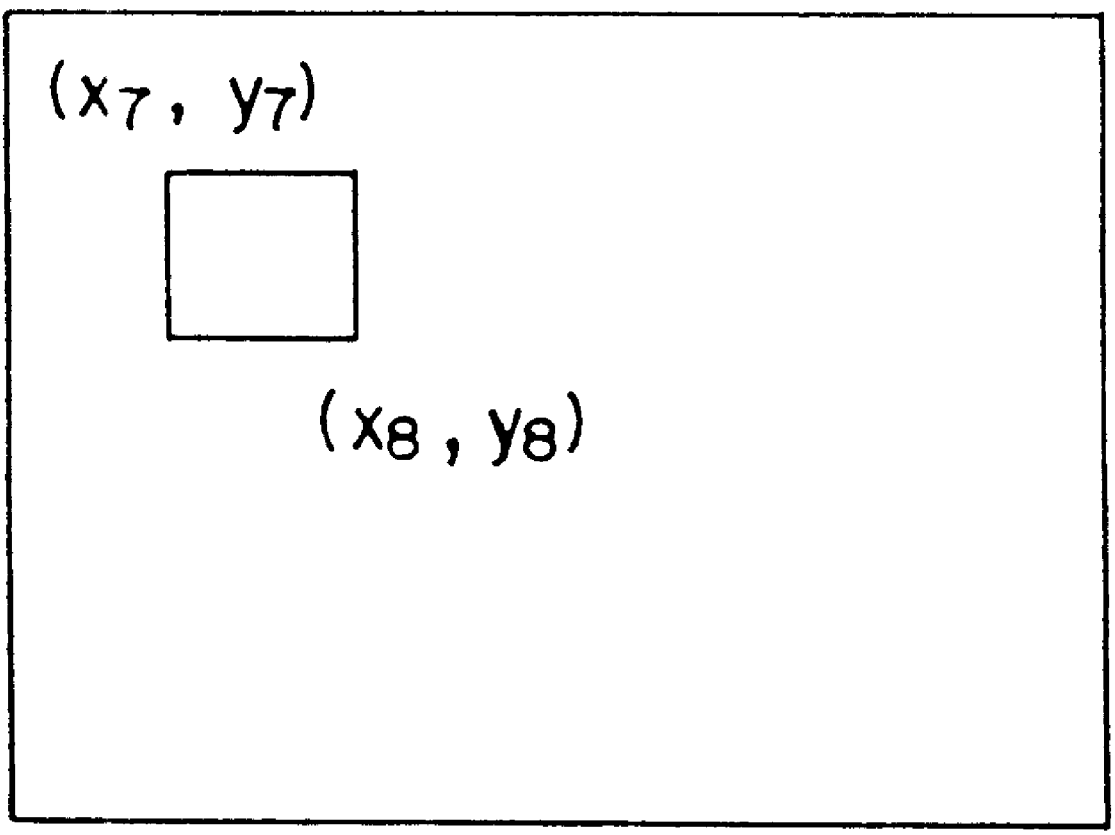
FIG. 9 is a diagram illustrating an AWB frame in FIG. 8.

FIG. 9 illustrates the operation of the circuit shown in FIG. 8. The outer frame portion represents the image plane. When coordinates (x7, y7) and (x8, y8) are written to the AWB frame register 405, an AWB frame as shown in the drawing is obtained, and the color difference signals on the inside of this frame are input to the integrators 402 and 404 of FIG. 8.

Figure 19:
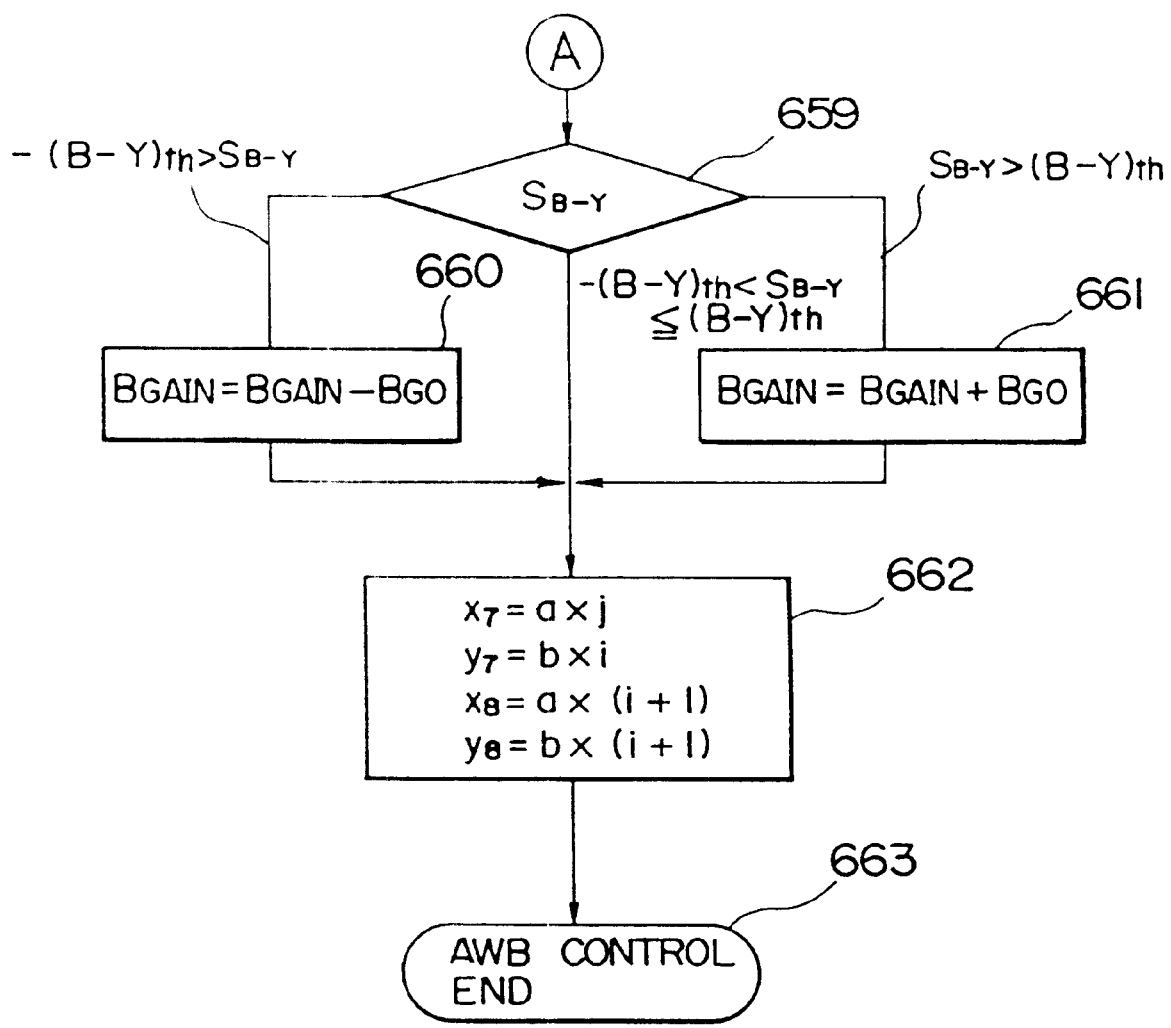
FIG. 19 is an operation diagram showing a continuation of the operation flowchart of FIG. 18.
Figure 20:
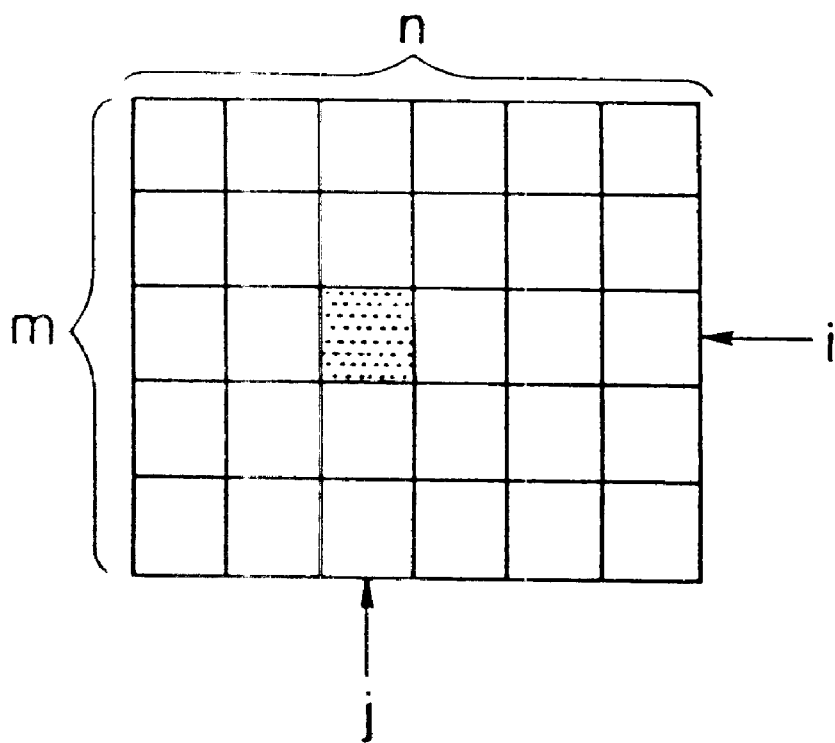
FIG. 20 is a diagram illustrating an AWB frame in FIG. 19.
Figure 20:
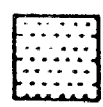

The output of these integrators 402 and 404 is used in AWB control in accordance with the algorithm shown in FIGS. 18 to 20 described below.

Figure 10:
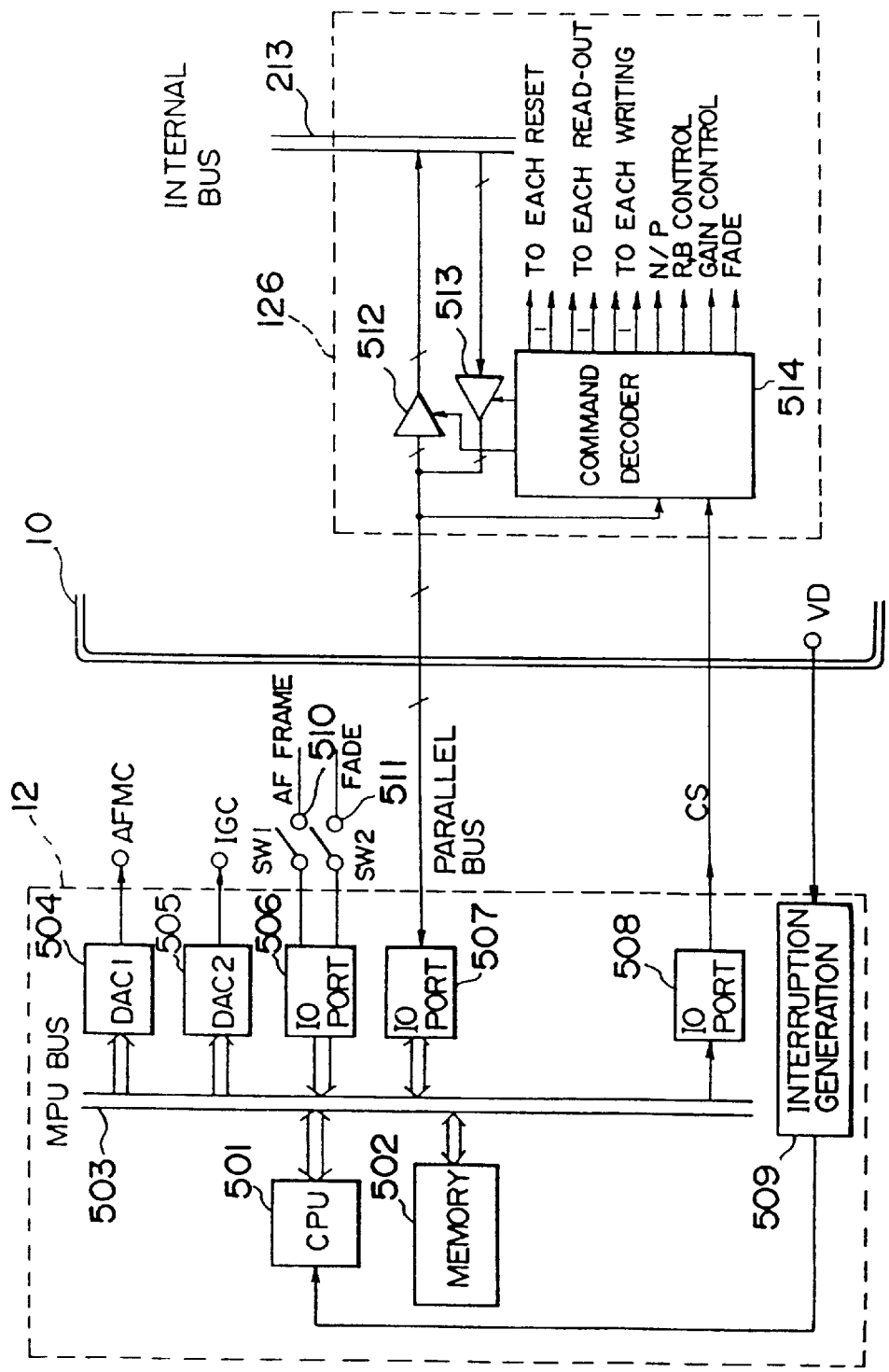
FIG. 10 is a detailed view of an MPU interface in the embodiment of FIG. 1.

FIG. 10 shows in detail the MPU circuit 12 and the MPU interface circuit 126 of FIG. 1. The components indicated by numerals 501 to 509 are provided inside the MPU circuit 12. Numeral 501 indicates a CPU circuit; numeral 502 indicates a memory for holding predetermined programs and data; numeral 503 indicates an internal bus of the MPU circuit; numerals 504 and 505 indicate DA converters; numerals 506, 507 and 508 indicate I/O ports; and numeral 509 indicates an interruption generating section. Numerals 510 and 511 indicate switches connected to the I/O port 506 of the MPU circuit 12; numerals 512 and 513 indicate bus buffers adapted to operate in accordance with control signals; and numeral 514 indicates a command decoder adapted to interpret input commands and generate signals for controlling the different sections inside the integrated circuit 10.

In accordance with the program of the memory 502, the CPU 501 reads the conditions of the switches SW1 and SW2 connected to the IO port 506, inputs and outputs data and commands to the MPU interface circuit 126 through IO ports 507 and 508, and generates an AF motor control voltage AFMC and an IG control voltage IGC through the DA converters 504 and 505. Further, when the vertical synchronization signal VD is input, the interruption generating section 509 generates in the CPU 501 an interruption signal, whereby the CPU performs processing at the time of interruption.

The switch SW1 is a switch for setting the size of the AF frame. By manipulating this switch, the operator can select either of the AF frames having different sizes shown in FIGS. 3 and 4. Further, it is also possible to employ an arrangement in which still other patterns can be selected. The switch SW2 is a switch for performing a fading operation. By depressing this switch, the operator can effect fade-out or fade-in of an image. The command decoder 514 receives a command from the I0 port 507 in accordance with a chip select signal CS generated at the IO port 508, and interprets the command. When it is a write command, the bus buffer 512 is operated and, at the same time, a corresponding write pulse is generated. When it is a read-out command, the bus buffer 513 is operated and, at the same time, a corresponding read-out pulse is generated.

Further, in accordance with a reset command, setting commands for different sections, etc., a reset pulse, an NTSC/PAL switching pulse, a fade signal, etc. are generated.

FIGS. 11 to 19 are flowcharts illustrating the operation of the MPU circuit 12 shown in FIG. 10.

Figure 11:
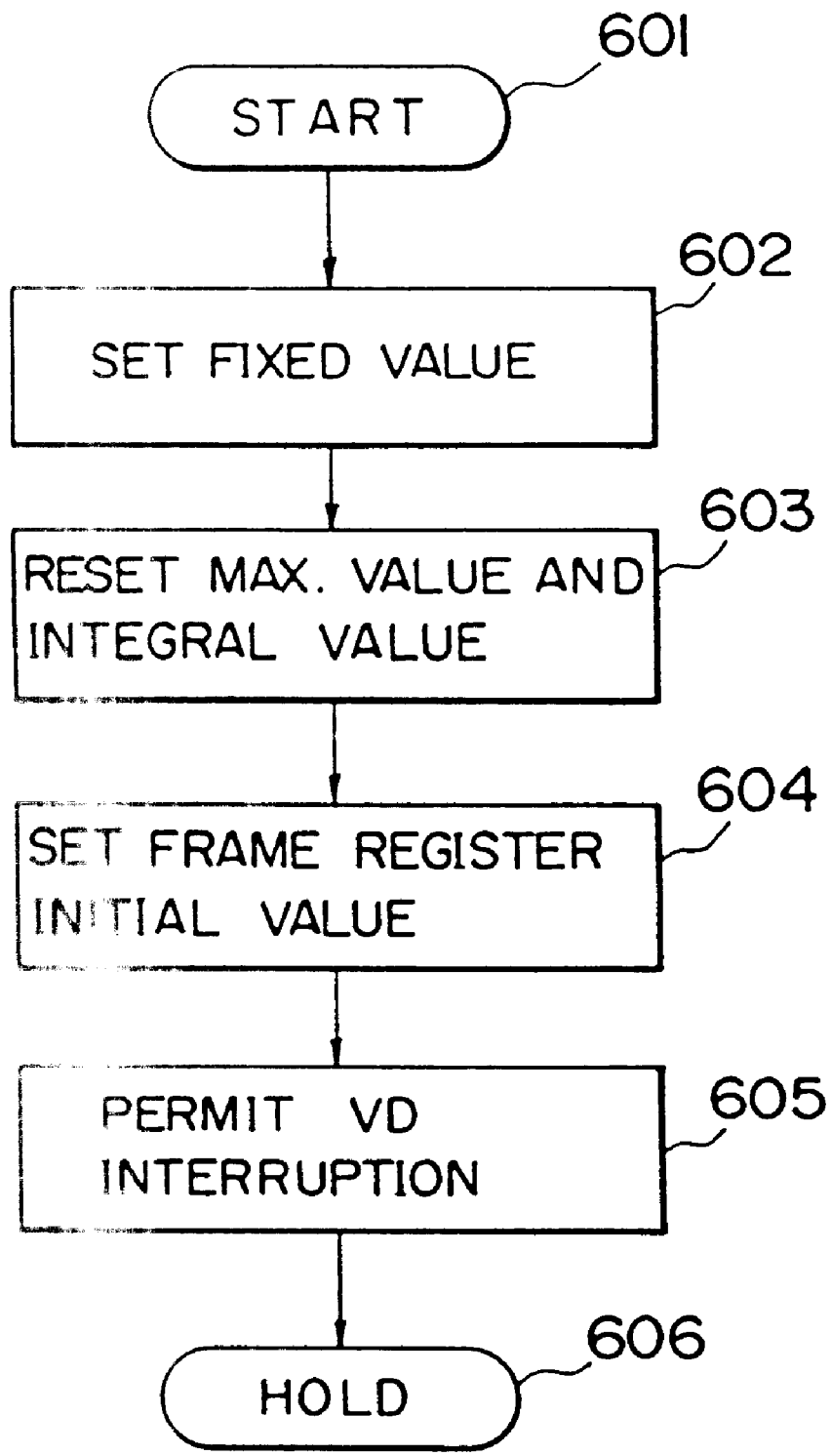

FIG. 11 shows the operation when power is turned on. The operation is started in step 601, and, in step 602, the NTSC/PAL switching is set, and the fixed values in the integrated circuit, such as the initial gain values, etc. are set through the MPU interface circuit 126. In step 603, the maximum value or integral value of each of the preprocess circuits for AF, AE and AWB is reset, and, in step 604, the initial value of each frame register is set. In step 605, interruption by the vertical synchronization signal VD is permitted, and, in step 606, the circuit goes into hold state. Afterwards, the operation is performed in accordance with the interruption due to VD.

Figure 12:
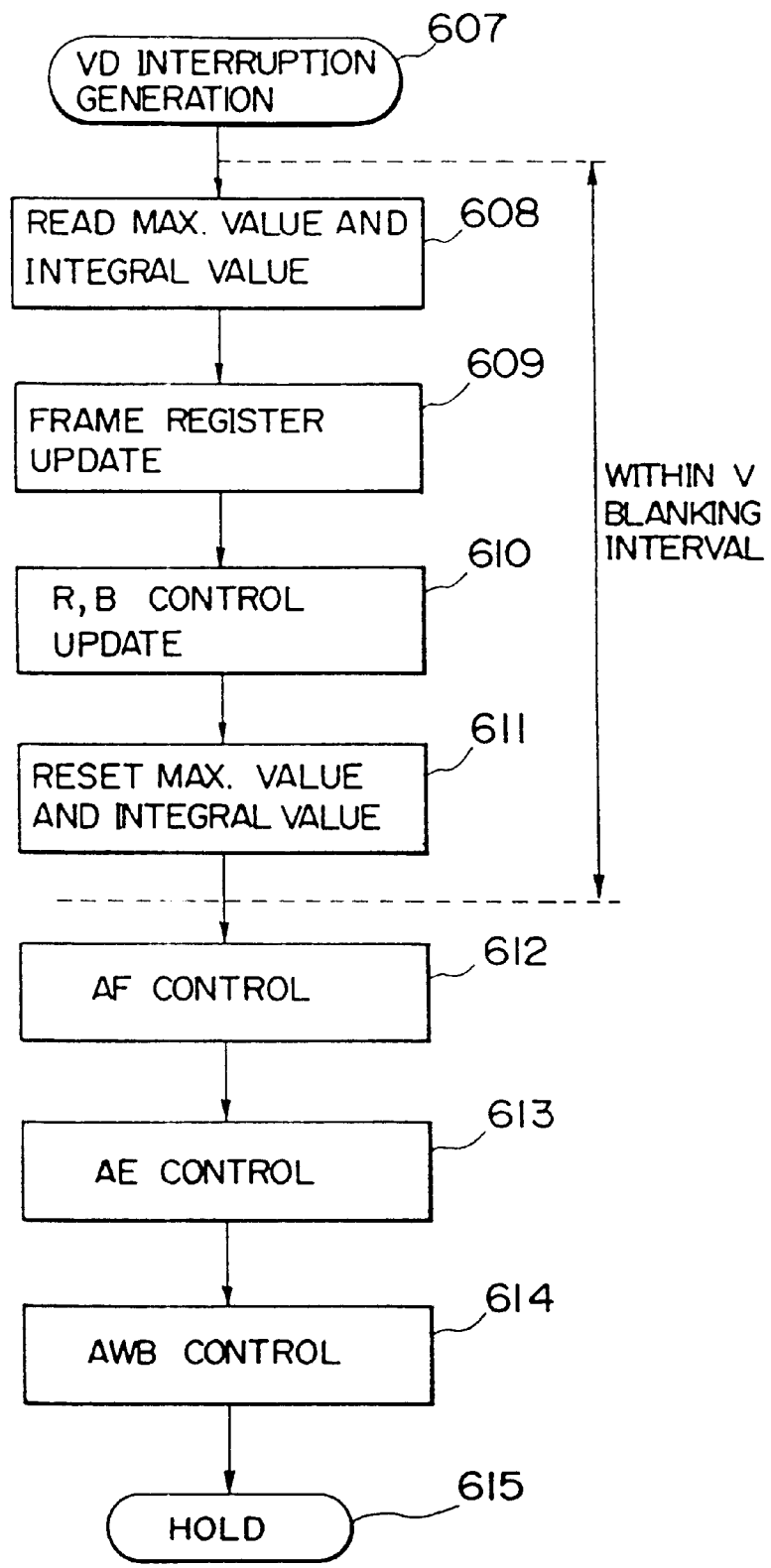
FIG. 12 is a diagram illustrating the operation when an interrupt due to VD has occurred in the MPU operation flowchart of the embodiment of FIG. 10.

FIG. 12 shows the operation at the time of VD interruption. When, in step 607, VD interruption is generated, the maximum value and integral value of each of the preprocess circuits for AF, AE and AWB are read, and, in step 609, the value of each of the frame registers for AF, AE and AWB is updated. In step 610, the R and B gain control values are updated and, in step 611, the maximum value and integral value of each of them are reset. The operations of steps 608 to 611 are completed within the vertical blanking interval. In steps 612 to 614, AF control, AE control and AWB control are performed and, in step 615, the circuit goes into hold state again to await VD interruption. The operations of steps 607 to 615 are completed within one vertical blanking interval (16 ms to 20 ms).

FIG. 13 illustrates in detail the AF control in step 612 of FIG. 12. First, the control is started in step 616 and, in step 617, the maximum value EV of the read high-frequency component in the vertical direction is compared with the maximum value EH of the high-frequency component in the horizontal direction. When EH is larger than EV, the AF operation is performed by using the high-frequency component in the horizontal direction. For this purpose, EH is substituted for the current value of the high-frequency component, Enow, in step 618. When, in step 617, EV is larger than EH, EV is substituted for Enow so as to use the high-frequency component in the vertical direction.

In step 620, the change in the high-frequency component, Ed, is obtained by subtracting the previous high-frequency component Eold from the current high-frequency component Enow. Further, Enow is substituted for Eold. In step 621, Ed is compared with predetermined threshold values Eth and −Eth. When Ed is smaller than −Eth, it is to be assumed that the high-frequency component has been reduced, i.e., the focus point has moved in the opposite direction, due to the rotation of the AF motor, or that the focus point has been displaced despite the motor remaining still. Accordingly, a judgment is made in step 622 as to whether the AF motor control voltage is 0 or not. When it is 0, a predetermined value SAF is substituted for AFMC in step 624 so as to turn the AF motor. When AFMC is not 0 in step 622, the polarity of AFMC is inverted so as to move the focus point in the opposite direction.

When, in step 621, Ed is larger than −Eth and smaller than Eth, it is to be assumed that the image sensing apparatus is in focus, so that in step 625, AFMC is reduced to 0 to stop the AF motor. When, in step 621, Ed is larger than Eth, focus control is in the right direction, so that AFMC is left as it is.

In step 626, the AFMC voltage set in the manner described above is output from the DA converter 504 inside the MPU 12. In step 627, the condition of the switch SW1 of FIG. 10 is checked. If the switch is in the OFF position, the frame size is set large, as shown in FIG. 3, in step 628 and, when the switch is in the ON position, the frame size is set small, as shown in FIG. 4, in step 629, the AF control being terminated in step 630 to proceed to AE control.

Figure 14:
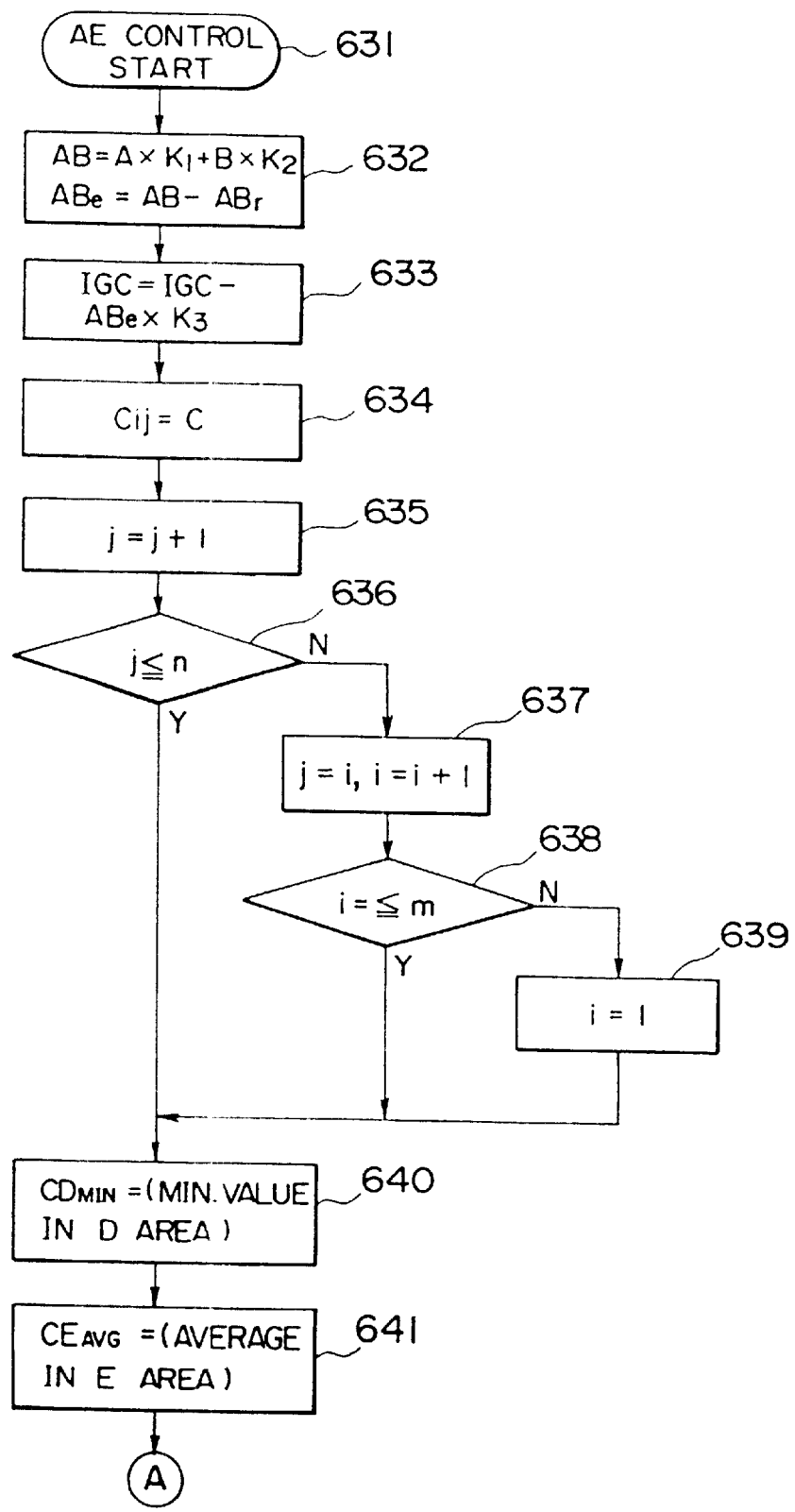
FIG. 14 is a diagram illustrating an operation of AE control in step 613 of the operation flowchart of FIG. 12.
Figure 15:
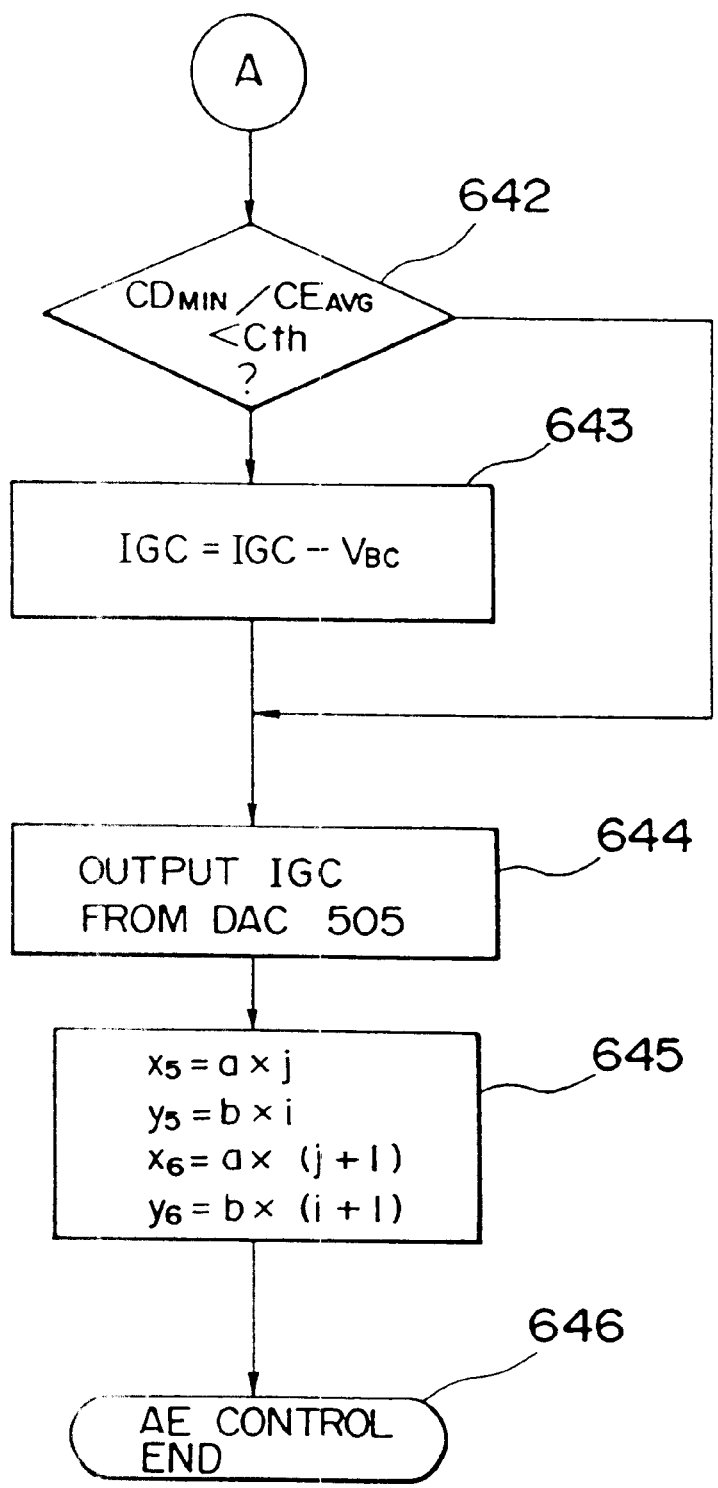
FIG. 15 is an operation diagram illustrating a continuation of the operation flowchart of FIG. 14.
Figure 16:
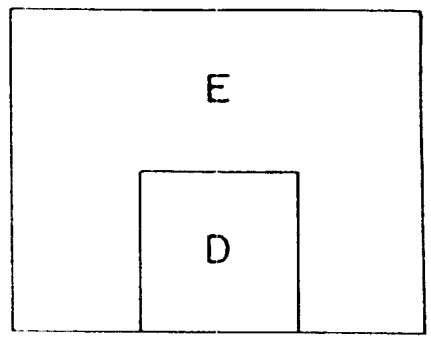
FIG. 16 is a diagram illustrating counter-light detecting operations in steps 640 to 642 of the operation flowcharts of FIGS. 14 and 15.

FIG. 14 is a flowchart illustrating in detail the AE control in step 613 of FIG. 12. The control starts in step 631, and, in step 632, a weighted average AB of the areas A and B in FIG. 6 is obtained. That is, the integral value A of the area A obtained as the output of the integrator 304 of FIG. 5 is multiplied by a weight K1, and the integral value B of the area B obtained as the output of the integrator 305 of FIG. 5 is multiplied by a weight K2. By adding up the two integral values, a weighting average AB is obtained. Further, the difference between this value and a reference value ABr is obtained as ABe.

In step 633, the value of ABe is multiplied by a predetermined coefficient K3, and the value thus obtained is subtracted from the current IG drive voltage IGC, thereby obtaining the next IG drive voltage IGC.

In step 634, the integral signal C read from the integrator 302 of FIG. 5 is substituted for data Cij on the current position of the C-frame, and, in step 635, j is incremented by 1. In step 636, j is compared with a predetermined number of division in the horizontal direction, n. If j is smaller than or equal to n, the procedure advances to step 640; if it is greater than n, j is set to 1 in step 637, and i is incremented by 1.

Further, in step 638, i is compared with a predetermined number of division in the vertical direction, m. If i is smaller than or equal to m, i is left as it is, and, when it is greater than m, i is set to 1 in step 639. Then, in step 640, the minimum value of C in the area D of FIG. 16, CDmin, is obtained, and, in step 641, the average of C in the area E of FIG. 16, CEavg, is obtained. In step 642 of FIG. 15, the ratio of CDmin to CEavg is compared with a predetermined threshold value Cth. When it is equal to or greater than Cth, the procedure advances to step 644; when it is smaller than Cth, the luminance of the background is rather high with respect to the subject, that is, the image sensing apparatus is in the so-called backlight state, so that, in step 643, a predetermined exposure correction value VBC is subtracted from IGC.

In step 604 of FIG. 11, the frame has been reset to C11, so that the frame C is sequentially switched field by field after power is turned on, with CDmin and CEavg changing each time such switching is effected.

Figure 17:
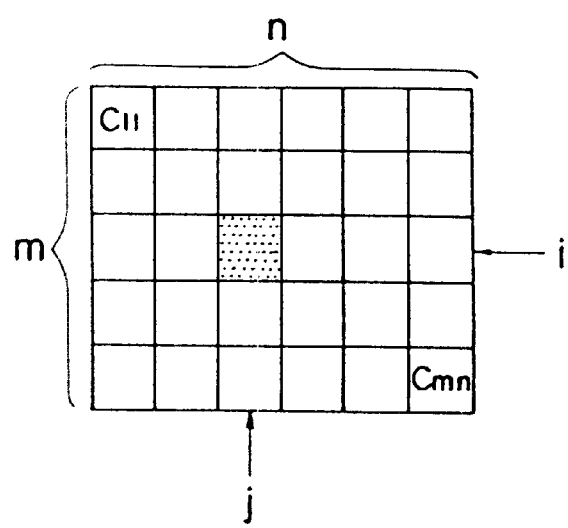
FIG. 17 is a diagram illustrating a frame C for AE control in FIG. 12.

In step 644, IGC is output from the DA converter 505. In step 645, x5, y5, x6 and y6 are obtained from the vertical and horizontal frame sizes a and b and the horizontal and vertical frame positions j and i so as to obtain the next position of the C-frame, and the AE control is terminated in step 646. FIG. 17 illustrates an AE control operation. In the drawing, the outer frame represents the image plane, which is divided into n sections in the horizontal direction and m sections in the vertical direction, the current position of the C-frame in the image plane being indicated by i and j. The AE control operation is terminated in step 646, and the procedure advances to AWB control.

Figure 18:
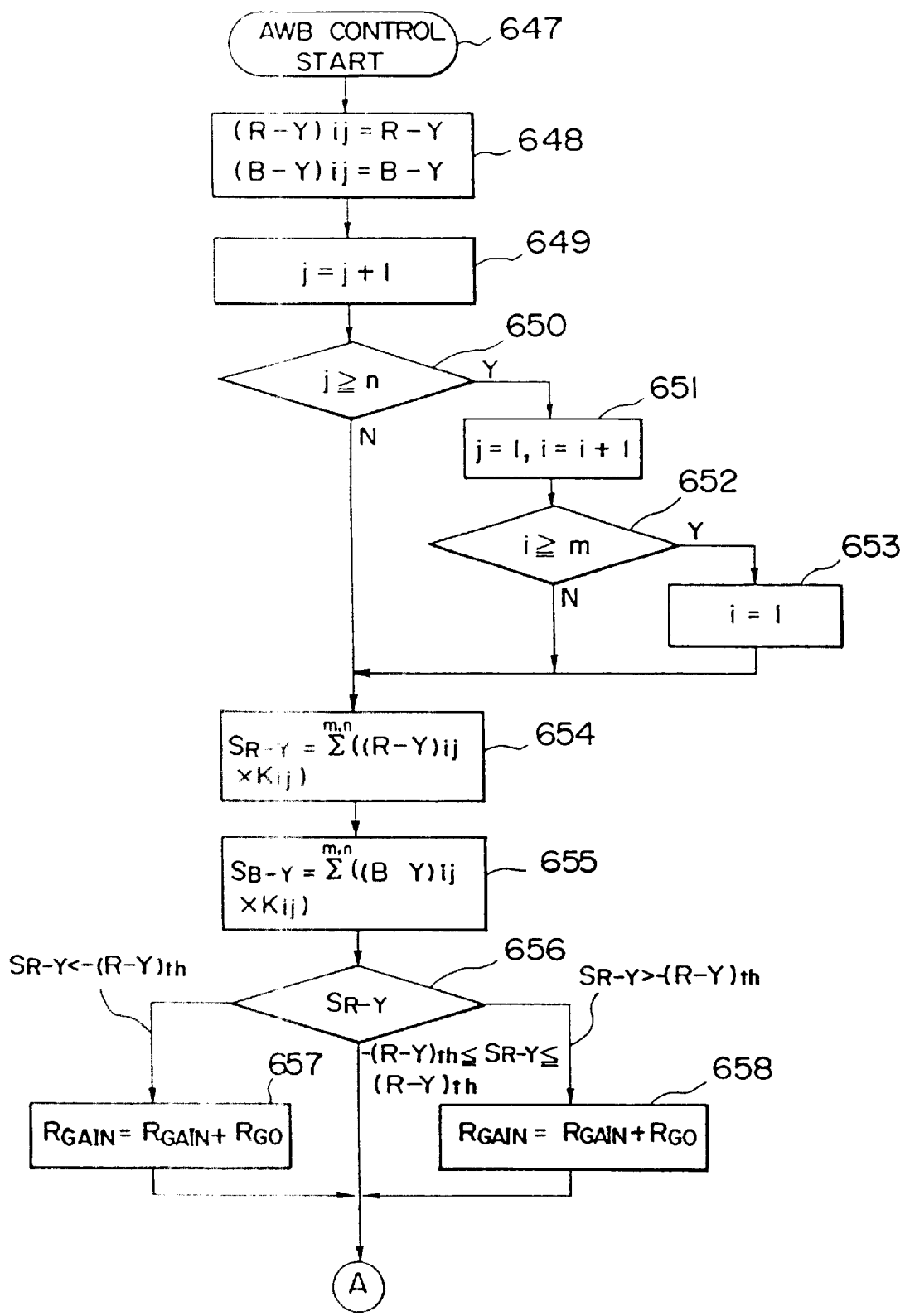
FIG. 18 is an operation diagram illustrating an AWB control in step 614 of the operation flowchart of FIG. 12.

FIG. 18 is a detailed flowchart of the AWB control step in FIG. 12. The AWB control is started in step 647, and, in step 648, the read data R-Y and B-Y is substituted for the color difference data on the current position of the AWB frame, (R-Y)ij and (B-Y)ij. In step 649, j is incremented by 1, and, in step 650, j is compared with the number of division in the horizontal direction of the AWB frame, n. When j is smaller than or equal to n, it is left as it is, and, if it is larger than n, j is set to 1 in step 651, and i is incremented by 1. In step 652, i is compared with the number of division in the vertical direction of the AWB frame, m. When i is smaller than or equal to m, it is left as it is, and, if it is larger than m, i is set to 1 in step 653.

As in the case of the AE frame, the AWB frame is reset to the upper left corner of the image plane. Afterwards, it is shifted field by field.

In step 654, the weighting total SR-Y of (R-Y)ij is obtained, and, in step 655, the weighting total SB-Y of (B-Y)ij is obtained. If, in step 656, SR-Y is smaller than a predetermined threshold value -(R-Y)th, a predetermined value RGO is subtracted from the R gain control value RGAIN, in step 657. If, in step 656, SR-Y is greater than or equal to -(R-Y)th and smaller than or equal to (R-Y)th, the value is left as it is, and, if SR-Y is greater than (R-Y)th, the predetermined value RGO is added to RGAIN in step 658. Likewise, if, in step 659 of FIG. 19, SB-Y is smaller than a predetermined threshold value -(B-Y)th, a predetermined value BGO is subtracted from the B gain control value RGAIN, in step 660.

If, in step 659, SB-Y is greater than or equal to -(B-Y)th and smaller than or equal to (B-Y)th, the value is left as it is, and, if SB-Y is greater than (B-Y)th, the predetermined value BGO is added to BGAIN in step 661. In step 662, x7, y7, x8 and y8 are obtained from the vertical and horizontal frame sizes a and b and the horizontal and vertical frame positions j and i so as to obtain the next position of the AWB frame, and the AE control operation is terminated in step 663. The values of n, m, a and b in FIG. 18 may be the same as or different from those in FIG. 14. FIG. 20 illustrates an AWB frame. In the drawing, the outer frame represents the image plane, which is divided into n sections in the horizontal direction and m sections in the vertical direction, the current position of the AWB frame in the screen being indicated by i and j.

As described above, the present invention provides an image sensing apparatus comprising: signal processing means for processing image sensing signals; a plurality of adjustment signal generating means for generating mutually different signals for automatic adjustment by using part of the signals of the signal processing means; interface means for inputting the output of the plurality of adjustment signal generating means and outputting it through a common signal path; and control means for adjusting a plurality of adjusting sections of the image sensing apparatus by using the output of the adjustment signal generating means. Due to this construction, it is only necessary for the microprocessor to receive processed data when performing automatic focusing, automatic exposure adjustment, automatic white balance adjustment or the like. Accordingly, it is possible to adopt an inexpensive microprocessor having relatively limited processing capability. Further, since the processing operation can be terminated within the vertical interval, the control speed can be increased. Furthermore, in the case where an integrated-circuit construction is adopted, the number of circuits for connection with the microprocessor is small, so that the mounting area can be made very small, thereby making it possible to realize the image sensing apparatus in a small size. Further, since no high-speed data is taken out of the integrated circuit, it is possible to minimize the radiation noise, the power noise due to capacity load and the like, thereby contributing to improvement in sensitivity.

What is claimed is:

1. An image pickup apparatus comprising:

image pickup means for converting an object image into an electric signal;

image pickup signal processing means for processing the electric signal from said image pickup means to output and image pickup signal which includes a sync signal;

adjustment signal generating means for generating an automatic adjustment signal on the basis of a signal within a predetermined frame of the image pickup signal output from said image pickup signal processing means and for setting a position of the predetermined frame according to frame setting data;

interface means for transmitting the automatic adjustment signal generated by said adjustment signal generating means and for receiving the frame setting data to supply the received frame setting data to said adjustment signal generating means; and control means connected through said interface means, for transmitting the frame setting data to said adjustment signal generating means and for receiving the automatic adjustment signal from said adjustment signal generating means to adjust an adjustment portion of said image pickup means or said image pickup signal processing means, wherein said adjustment signal generating means performs an update operation of frame setting on the basis of the frame setting data from said control means synchronously with the sync signal included in the image pickup signal in a blanking period of the sync signal.

2. An apparatus according to claim 1, wherein said adjustment signal generating means and said interface means are integrated on a common integrated circuit.

3. An apparatus according to claim 1, wherein said adjustment signal generating means generates an auto-focus adjustment signal.

4. An apparatus according to claim 1, wherein said adjustment signal generating means generates an auto-exposure adjustment signal.

5. An apparatus according to claim 1, wherein said adjustment signal generating means generates an auto-white balance adjustment signal.

6. An apparatus according to claim 1, wherein said interface means inputs the automatic adjustment signal from said adjustment signal generating means through an internal bus and outputs the automatic adjustment signal to said control means through a parallel bus.

7. An image pickup signal processing apparatus comprising:

image pickup signal processing means for processing an electric signal from image pickup means for converting an object image into the electric signal, to output an image pickup signal including a sync signal;

adjustment signal generating means for generating an automatic adjustment signal on the basis of a signal within a predetermined frame of the image pickup signal output from said image pickup processing means and for setting a position of the predetermined frame according to frame setting data; and interface means for transmitting the automatic adjustment signal from said adjustment signal generating means to control means for adjusting an adjustment portion of said image pickup means or said image pickup signal processing means, and for receiving the frame setting data from said control means to supply the received frame setting data to said adjustment signal generating means, wherein said adjustment signal generating means performs an update operation of frame setting on the basis of the frame setting data from said control means synchronously with the sync signal included in the image pickup signal in a blanking period of the sync signal.

8. An apparatus according to claim 7, wherein said adjustment signal generating means and said interface means are integrated on a common integrated circuit.

9. An apparatus according to claim 7, wherein said adjustment signal generating means generates an auto-focus adjustment signal.

10. An apparatus according to claim 7, wherein said adjustment signal generating means generates an auto-exposure adjustment signal.

11. An apparatus according to claim 7, wherein said adjustment signal generating means generates an auto-white exposure balance adjustment signal.

12. An apparatus according to claim 7, wherein said interface means inputs the automatic adjustment signal from said adjustment signal generating means through an internal bus and outputs the automatic adjustment signal to said control means through a parallel bus.

13. Image signal processing apparatus, comprising:

signal processing means for processing image signals to form a video signal;

pre-processing means for generating a preprocessed signal to be used for adjusting a part of a image sensing apparatus based on a image sensing signal; and a command decoder for receiving a command signal from a separate computer to control said preprocessing means, and for outputting the pre-processed signal to the separate computer;

wherein said signal processing means, said preprocessing means, and said command decoder are integrated as a signal processing integrated circuit on a common semiconductor.

14. Apparatus according to claim 13, wherein the pre-processed signal comprises a signal for automatic focus control.

15. Apparatus according to claim 13, wherein the pre-processed signal comprises a signal for automatic exposure control.

16. Apparatus according to claim 13, wherein the pre-processed signal comprises a signal for automatic white balance control.

17. Apparatus according to claim 13, wherein said command decoder outputs an interrupt signal to the separate computer.

18. Apparatus according to claim 17, wherein the interrupt signal includes a synchronizing signal.

19. Apparatus according to claim 13, wherein said command decoder has a chip select signal input terminal.

20. Apparatus according to claim 13, wherein said command decoder has a parallel bus connected to the separate computer.

21. Apparatus according to claim 20, wherein the command signal inputted from the separate computer and the pre-processed signal outputted to the separate computer selectively pass through said parallel bus.

22. An image sensing apparatus having an adjusting section, said apparatus comprising:

signal processing means for processing image sensing signals;

adjustment signal generating means for generating an automatic adjustment signal by using a portion of the signals processed by said signal processing means;

interrupt signal output means for outputting an interrupt signal to a separate computer; and control means for, in response to the interrupt signal, adjusting the adjusting section of said image sensing apparatus by using the output of said adjustment signal generating means, wherein said signal processing means, said adjustment signal generating means, and said interrupt signal output means are integrated as a signal processing integrated circuit on a common semiconductor.

23. Apparatus according to claim 22, wherein said adjustment signal generating means generates signals for automatic focusing.

24. Apparatus according to claim 22, wherein said adjustment signal generating means generates signals for automatic exposure adjustment.

25. Apparatus according to claim 22, wherein said adjustment signal generating means generates signals for white balance adjustment.

26. An image processing circuit comprising:

signal processing means for processing image sensing signals;

adjustment signal generating means for generating an adjustment signal by using a portion of the signals processed by said signal processing means; and interrupt signal output means for outputting the output of said adjustment signal generating means and an interrupt signal to a separate computer, wherein said signal processing means, said adjustment signal generating means, and said interrupt means are integrated as a signal processing integrated circuit on a common semiconductor.

27. A circuit according to claim 26, wherein said adjustment signal generating means generates adjustment signals for at least one of an automatic focusing function, an automatic iris adjustment function, and an automatic white balance adjustment function.

28. A circuit according to claim 27, wherein said interrupt signal output means converts the adjustment signal of said adjustment signal generating means to a predetermined arithmetic-processing form.

29. A circuit according to claim 28, wherein at least two of said automatic focusing function, said automatic iris adjustment function, and said automatic white balance adjustment function are executed sequentially.

30. Image sensing apparatus comprising:

image sensing means for sensing an object image and producing an image sensing signal;

signal processing means for processing said image sensing signal to form a video signal;

pre-processing means for generating a pre-processed signal to be used for adjusting a part of said image sensing apparatus based on the image sensing signal; and a command decoder for receiving a command signal from a separate computer to control said pre-processing means, and for outputting the pre-processed signal to the separate computer;

wherein said signal processing means, said pre-processing means, and said command decoder are integrated as a signal processing integrated circuit on a common semiconductor.

31. Apparatus according to claim 30, wherein the pre-processed signal comprises a signal for automatic exposure control.

32. Apparatus according to claim 30, wherein the pre-processed signal comprises a signal for automatic focusing control.

33. Apparatus according to claim 30, wherein the pre-processed signal comprises a signal for automatic white balance control.

34. Apparatus according to claim 30, wherein said command decoder outputs an interrupt signal to the separate computer.

35. Apparatus according to claim 34, wherein the interrupt signal includes a synchronizing signal.

36. Apparatus according to claim 30, wherein said command decoder includes a chip select signal input terminal.

37. Apparatus according to claim 30, wherein said command decoder has a parallel bus connected to the separate computer.

38. Apparatus according to claim 37, wherein the command signal inputted from the separate computer and the pre-processed signal outputted to the separate computer selectively pass through said parallel bus.

39. An image pickup apparatus comprising:

image pickup means for converting an object image into a electric signal;

image pickup signal processing means for processing the electric signal from said image pickup means to output an image pickup signal which includes a sync signal;

a plurality of adjustment signal generating means for generating an automatic adjustment signal on the basis of a signal within a predetermined frame of the image pickup signal output from said image pickup signal processing means, said plurality of adjustment signal generating means including a frame counter adapted to count a signal corresponding to a position of the predetermined frame and a frame register adapted to store frame setting data and setting the predetermined frame on the basis of comparison of a count value of said frame counter and the frame setting data stored in said frame register;

interface means for transmitting the automatic adjustment signal generated by said adjustment signal generating means and for receiving the frame setting data to supply the received frame setting data to said frame register; and control means connected through said interface means, for transmitting the frame setting data to said frame register and for receiving the automatic adjustment signal from said adjustment signal generating means to adjust an adjustment portion of said image pickup means or said image pickup signal processing means, wherein said adjustment signal generating means performs an update operation of frame setting on the basis of the frame setting data from said control means synchronously with the sync signal included in the image pickup signal in a blanking period of the sync signal.

40. An image pickup signal processing apparatus comprising:

image pickup signal processing means for processing an electric signal from image pickup means for converting an object image into the electric signal, to output an image pickup signal including a sync signal;

a plurality of adjustment signal generating means for generating an automatic adjustment signal on the basis of a signal within a predetermined frame of the image pickup signal output from said image pickup signal processing means, said plurality of adjustment signal generating means including a frame counter adapted to count a signal corresponding to a position of the predetermined frame and a frame register adapted to store frame setting data and setting the predetermined frame on the basis of comparison of a count value of said frame counter and the frame setting data stored in said frame register;

interface means for transmitting the automatic adjustment signal from said adjustment signal generating means to control means for adjusting an adjustment portion of said image pickup means or said image pickup signal processing means, and for receiving the frame setting data from said control means to supply the received frame setting data to said frame register, wherein said adjustment signal generating means performs an update operation of frame setting on the basis of the frame setting data from said control means synchronously with the sync signal included in the image pickup signal in a blanking period of the sync signal.

41. An image pickup apparatus comprising:

image pickup means for converting an object image into a electric signal;

image pickup signal processing means for processing the electric signal from said image pickup means to output an image pickup signal which includes a sync signal;

adjustment signal generating means for generating an automatic adjustment signal on the basis of a signal within a predetermined frame of the image pickup signal output from said image pickup signal processing means and for setting a position of the predetermined frame according to frame setting data;

interface means for transmitting the automatic adjustment signal generated by said adjustment signal generating means and for receiving the frame setting data to supply the received frame setting data to said adjustment signal generating means; and control means connected through said interface means, for transmitting the frame setting data to said adjustment signal generating means and for receiving the automatic adjustment signal from said adjustment signal generating means to adjust an adjustment portion of said image pickup means or said image pickup signal processing means, said control means including a CPU and an interrupt signal generating means for supplying an interrupt signal to said CPU synchronously with the sync signal included in the image pickup signal, wherein said adjustment signal generating means performs an update operation of frame setting on the basis of the frame setting on the basis of the frame setting data in response to the interrupt signal from said interrupt signal generating means in a blanking period of the sync signal.

42. An image pickup signal processing apparatus comprising:

image pickup signal processing means for processing an electric signal from image pickup means for converting an object image into the electric signal, to output an image pickup signal including a sync signal;

adjustment signal generating means for generating an automatic adjustment signal on the basis of a signal within a predetermined frame of the image pickup signal output from said image pickup processing means and for setting a position of the predetermined frame according to frame setting data; and interface means for transmitting the automatic adjustment signal from said adjustment signal generating means to control means for adjusting an adjustment portion of said image pickup means or said image pickup signal processing means, and for receiving the frame setting data from said control means to supply the received frame setting data to said adjustment signal generating means, wherein said control means effects an interrupt operation with a CPU included therein, and said interrupt operation causes said adjustment signal generating means to perform an update operation of frame setting on the basis of the frame setting data from said control means in a blanking period of the sync signal.

43. An image sensing apparatus having an adjusting section, said apparatus comprising:

a common semiconductor;

a signal processing integrated circuit formed on said common semiconductor, said signal processing integrated circuit comprising:

a signal processor that processes image sensing signals;

an adjustment signal generator that generates an automatic adjustment signal using a portion of the image sensing signals processed by said signal processor; and an interrupt signal generator that outputs an interrupt signal to an external computer; and a controller that adjusts the adjusting section of the image sensing apparatus, using the output of said adjustment signal generator, in response to the interrupt signal.

44. Apparatus according to claim 43, wherein said adjustment signal generator generates signals for automatic focusing.

45. Apparatus according to claim 43, wherein said adjustment signal generator generates signals for automatic exposure adjustment.

46. Apparatus according to claim 43, wherein said adjustment signal generator generates signals for white balance adjustment.

47. An image processing circuit comprising:

a common semiconductor; and a signal processing integrated circuit formed on said common semiconductor, said signal processing integrated circuit comprising:

a signal processor that processes image sensing signals;

an adjustment signal generator that generates an adjustment signal using a portion of the signals processed by said signal processor; and an interrupt signal generator that outputs the output of said adjustment signal generator and an interrupt signal to an external computer.

48. A circuit according to claim 47, wherein said adjustment signal generator generates adjustment signals for at least one of an automatic focusing function, an automatic iris adjustment function, and an automatic white balance adjustment function.

49. A circuit according to claim 48, wherein said interrupt signal generator converts the adjustment signal of said adjustment signal generator to a predetermined arithmetic processing form.

50. A circuit according to claim 49, wherein at least two of said automatic focusing function, said automatic iris adjustment function, and said automatic white balance adjustment function are executed sequentially.

51. Image sensing apparatus comprising:
- an image sensor that senses an object image and produces an image sensing signal;
- a common semiconductor;
- a signal processing integrated circuit formed on said common semiconductor, said signal processing integrated circuit comprising:
  - a signal processor that processes the image sensing signal and forms a video signal; and
  - a pre-processor that generates a pre-processed signal to be used for adjusting a part of the image sensing apparatus based on the image sensing signal; and
- a command decoder that receives a command signal from an external computer to control said pre-processor, and that outputs the pre-processed signal to the external computer.

52. Apparatus according to claim 51, wherein the pre-processed signal comprises a signal for automatic exposure control.

53. Apparatus according to claim 51, wherein the pre-processed signal comprises a signal for automatic focusing control.

54. Apparatus according to claim 51, wherein the pre-processed signal comprises a signal for automatic white balance control.

55. Apparatus according to claim 51, wherein said command decoder outputs an interrupt signal to the external computer.

56. Apparatus according to claim 55, wherein the interrupt signal includes a synchronizing signal.

57. Apparatus according to claim 51, wherein said command decoder includes a chip select signal input terminal.

58. Apparatus according to claim 51, wherein said command decoder has a parallel bus connected to the external computer.

59. Apparatus according to claim 58, wherein the command signal input from the external computer and the pre-processed signal output to the external computer selectively pass through said parallel bus.

60. An image pickup apparatus comprising:
- an image pickup device that converts an object image into an electric signal;
- an image pickup signal processor that processes the electric signal from said image pickup device and outputs an image pickup signal which includes a sync signal;
- a plurality of adjustment signal generators that generate an automatic adjustment signal on the basis of a signal within a predetermined frame of the image pickup signal output from said image pickup signal processor, said plurality of adjustment signal generators including a frame counter adapted to count a signal corresponding to a position of the predetermined frame and a frame register adapted to store frame setting data and setting the predetermined frame on the basis of comparison of a count value of said frame counter and the frame setting data stored in said frame register;
- an interface that transmits the automatic adjustment signal generated by said adjustment signal generator, receives the frame setting data, and supplies the received frame setting data to said frame register; and
- a controller connected through said interface, and transmitting the frame setting data to said frame register, receiving the automatic adjustment signal from said adjustment signal generator, and adjusting an adjustment portion of said image pickup device or said image pickup signal processor, wherein said adjustment signal generator performs an update operation of frame setting on the basis of the frame setting data from said controller synchronously with the sync signal included in the image pickup signal in a blanking period of the sync signal.

61. An image pickup signal processing apparatus comprising:
- an image pickup signal processor that processes an electric signal from an image pickup device, which converts an object image into the electric signal, and outputs an image pickup signal including a sync signal;
- a plurality of adjustment signal generators that generate an automatic adjustment signal on the basis of a signal within a predetermined frame of the image pickup signal output from said image pickup signal processor, said plurality of adjustment signal generators including a frame counter adapted to count a signal corresponding to a position of the predetermined frame and a frame register adapted to store frame setting data and setting the predetermined frame on the basis of comparison of a count value of said frame counter and the frame setting data stored in said frame register;
- an interface that transmits the automatic adjustment signal from said adjustment signal generator to a controller that adjusts an adjustment portion of said image pickup device or said image pickup signal processor, receives the frame setting data from said controller, and supplies the received frame setting data to said frame register, wherein said adjustment signal generator performs an updata operation of frame setting on the basis of the frame setting data from said controller synchronously with the sync signal included in the image pickup signal in a blanking period of the sync signal.

62. An image pickup apparatus comprising:
- an image pickup device that converts an object image into an electric signal;
- an image pickup signal processor that processes the electric signal from said image pickup device, and outputs an image pickup signal which includes a sync signal;
- an adjustment signal generator that generates an automatic adjustment signal on the basis of a signal within a predetermined frame of the image pickup signal output from said processor and sets a position of the predetermined frame according to frame setting data;
- an interface that transmits the automatic adjustment signal generated by said adjustment signal generator, receives the frame setting data, and supplies the received frame setting data to said adjustment signal generator; and
- a controller connected through said interface, and transmitting the frame setting data to said adjustment signal generator, receiving the automatic adjustment signal from said adjustment signal generator, and adjusting an adjustment portion of said image pickup device or said image pickup signal processor, said controller including a CPU and an interrupt signal generator that supplies an interrupt signal to said CPU synchronously with the sync signal included in the image pickup signal, wherein said adjustment signal generator performs an update operation of frame setting on the basis of the frame setting data in response to the interrupt signal from said interrupt signal generator in a blanking period of the sync signal.

63. An image pickup signal processing apparatus comprising:

a processor that processes an electric signal from an image pickup device, which converts an object image into the electric signal, and outputs an image pickup signal including a sync signal;

an adjustment signal generator that generates an automatic adjustment signal on the basis of a signal within a predetermined frame of the image pickup signal output from said image pickup processor and sets a position of the predetermined frame according to frame setting data; and an interface that transmits the automatic adjustment signal from said adjustment signal generator to a controller, adjusts an adjustment portion of said image pickup device or said image pickup signal processor, receives the frame setting data from said controller, and supplies the received frame setting data to said adjustment signal generating means, wherein said controller effects an interrupt operation with a CPU included therein, and said interrupt operation causes said adjustment signal generator to perform an update operation of frame setting on the basis of the frame setting data from said controller in a blanking period of the sync signal.

64. An image pickup apparatus comprising:

an image pickup device that converts an object image into an electric signal;

an image pickup signal processor that processes the electric signal from said image pickup device and outputs an image pickup signal which includes a sync signal;

an adjustment signal generator that generates an automatic adjustment signal on the basis of a signal within a predetermined frame of the image pickup signal output from said image pickup signal processor and sets a position of the predetermined frame according to frame setting data;

an interface that transmits the automatic adjustment signal generated by said adjustment signal generator and receives the frame setting data to supply the received frame setting data to said adjustment signal generator; and a controller connected through said interface, that transmits the frame setting data to said adjustment signal generator and receives the automatic adjustment signal from said adjustment signal generator to adjust an adjustment portion of said image pickup device or said image pickup signal processor, wherein said adjustment signal generator performs an update operation of frame setting on the basis of the frame setting data from said controller synchronously with the sync signal included in the image pickup signal in a blanking period of the sync signal.

65. An apparatus according to claim 64, wherein said adjustment signal generator and said integrated on a common integrated circuit.

66. An apparatus according to claim 64, wherein said adjustment signal generator generates an auto-focus adjustment signal.

67. An apparatus according to claim 64, wherein said adjustment signal generator generates an auto-exposure adjustment signal.

68. An apparatus according to claim 64, wherein said adjustment signal generator generates an auto-white balance adjustment signal.

69. An apparatus according to claim 64, wherein said interface inputs the automatic adjustment signal from said adjustment signal generator through an internal bus and outputs the automatic adjustment signal to said controller through a parallel bus.

70. An image pickup signal processing apparatus comprising:

an image pickup signal processor that processes an electric signal received from an image pickup device, which converts an object image into the electric signal, and outputs an image pickup signal including a sync signal;

an adjustment signal generator that generates an automatic adjustment signal on the basis of a signal within a predetermined frame of the image pickup signal ouput from said image pickup signal processor and sets a position of the predetermined frame according to frame setting data; and an interface that transmits the automatic adjustment signal from said adjustment signal generator to a controllor that adjusts an adjustment portion of said image pickup device or said image pickup signal processor, and receives the frame setting data from said controller to supply the received frame setting data to said adjustment signal generator, wherein said adjustment signal generator performs an update operation of frame setting on the basis of the frame data from said controller synchronously with the sync signal included in the image pickup signal in a blanking period of the sync signal.

71. An apparatus according to claim 70, wherein said adjustment signal generator and said interface are integrated on a common integrated circuit.

72. An apparatus according to claim 70, wherein said adjustment signal generator generates an auto-focus adjustment signal.

73. An apparatus according to claim 70, wherein said adjustment signal generator generates an auto-exposure adjustment signal.

74. An apparatus according to claim 70, wherein said adjustment signal generator generates an auto-white exposure balance adjustment signal.

75. An apparatus according to claim 70, wherein said interface inputs the automatic adjustment signal from said adjustment signal generator through an internal bus and outputs the automatic adjustment signal to said controller through a parallel bus.

76. Image signal processing apparatus, comprising:

a common semiconductor; and a signal processing integrated circuit formed on said common semiconductor, said signal processing integrated circuit comprising:

a signal processor that processes image signals and forms a video signal;

a pre-processor that generates a pre-processed signal to be used for adjusting a part of an image sensing apparatus based on an image sensing signal; and a command decoder that receives a command signal from an external computer to control said pre-processor, and outputs the pre-processed signal to the external computer.

77. Apparatus according to claim 76, wherein the pre-processed signal comprises a signal for automatic focus control.

78. Apparatus according to claim 76, wherein the pre-processed signal comprises a signal for automatic exposure control.

79. Apparatus according to claim 76, wherein the pre-processed signal comprises a signal for automatic white balance control.

80. Apparatus according to claim 76, wherein said command decoder outputs an interrupt signal to the external computer.

81. Apparatus according to claim 80, wherein the interrupt signal includes a synchronizing signal.

82. Apparatus according to claim 76, wherein said command decoder has a chip select input terminal.

83. Apparatus according to claim 76, wherein said command decoder has a parallel bus connected to the external computer.

84. Apparatus according to claim 83, wherein the command signal input from the external computer and the pre-processed signal output to the external computer selectively pass through said parallel bus.

\* \* \* \* \*

UNITED STATES PATENT AND TRADEMARK OFFICE
CERTIFICATE OF CORRECTION

PATENT NO. : 6,353,488 B1
DATED : March 5, 2002
INVENTOR(S) : Teruo Hieda et al.

It is certified that error appears in the above-identified patent and that said Letters Patent is hereby corrected as shown below:

Column 3,
Line 11, "is" should read -- is a --.

Column 8,
Line 66, "indicate" should read -- indicates --.

Column 9,
Line 1, "to." should read -- to --.
Line 10, "pulses.," should read -- pulses, --.
Line 66, "10" should read -- I0 --.

Column 11,
Line 19, "weighting" should read -- weighted --.

Column 13,
Line 9, "and" should read -- an --.

Column 14,
Line 32, "a" should read -- an --.
Line 33, "a" should read -- an --.

Column 15,
Line 46, "arithmetic-processing" should read -- arithmetic processing --.

Column 17,
Line 26, "a" should read -- an --.

Column 22,
Line 27, "frame data" should read -- frame setting data --.

UNITED STATES PATENT AND TRADEMARK OFFICE
CERTIFICATE OF CORRECTION

PATENT NO. : 6,353,488 B1
DATED : March 5, 2002
INVENTOR(S) : Teruo Hieda et al.

It is certified that error appears in the above-identified patent and that said Letters Patent is hereby corrected as shown below:

Column 23,
Line 10, "select input" should read -- select signal input --.

Signed and Sealed this

Eighteenth Day of June, 2002

Attest:

Attesting Officer

JAMES E. ROGAN
*Director of the United States Patent and Trademark Office*